(12) United States Patent
Miura et al.

(10) Patent No.: US 9,387,464 B2
(45) Date of Patent: Jul. 12, 2016

(54) IRON OXIDE-ZIRCONIA COMPOSITE OXIDE AND METHOD FOR PRODUCING SAME, AND EXHAUST GAS PURIFICATION CATALYST

(71) Applicants: Masahide Miura, Toyota (JP); Atsushi Tanaka, Toyota (JP); Takahiro Suzuki, Toyota (JP); Tadashi Suzuki, Seto (JP); Toshitaka Tanabe, Nagakute (JP); Naoki Takahashi, Nagoya (JP)

(72) Inventors: Masahide Miura, Toyota (JP); Atsushi Tanaka, Toyota (JP); Takahiro Suzuki, Toyota (JP); Tadashi Suzuki, Seto (JP); Toshitaka Tanabe, Nagakute (JP); Naoki Takahashi, Nagoya (JP)

(73) Assignee: TOYOTA JIDOSHA KABUSHIKI KAISHA, Toyota-shi, Aichi (JP)

( * ) Notice: Subject to any disclaimer, the term of this patent is extended or adjusted under 35 U.S.C. 154(b) by 0 days.

(21) Appl. No.: 14/384,283

(22) PCT Filed: Apr. 26, 2013

(86) PCT No.: PCT/JP2013/062496
§ 371 (c)(1),
(2) Date: Sep. 10, 2014

(87) PCT Pub. No.: WO2013/162029
PCT Pub. Date: Oct. 31, 2013

(65) Prior Publication Data
US 2015/0080211 A1  Mar. 19, 2015

(30) Foreign Application Priority Data

| Apr. 27, 2012 | (JP) | 2012-102987 |
|---|---|---|
| May 18, 2012 | (JP) | 2012-114291 |
| May 18, 2012 | (JP) | 2012-114390 |
| Apr. 25, 2013 | (JP) | 2013-092232 |

(51) Int. Cl.
*B01J 23/00* (2006.01)
*B01J 23/08* (2006.01)
(Continued)

(52) U.S. Cl.
CPC .............. *B01J 23/894* (2013.01); *B01J 23/745* (2013.01); *B01J 23/83* (2013.01); *B01J 35/002* (2013.01);
(Continued)

(58) Field of Classification Search
CPC .......... B01J 21/04; B01J 21/066; B01J 23/10; B01J 23/56; B01J 23/63; B01J 23/745; B01J 23/76; B01J 23/83; B01J 23/8906; B01J 23/894
USPC ......... 502/302–304, 326, 327, 332–334, 336, 502/338, 339, 349, 355
See application file for complete search history.

(56) References Cited

U.S. PATENT DOCUMENTS 6,235,677 B1 * 5/2001 Manzer ................. B01J 23/894
502/232

(Continued)

FOREIGN PATENT DOCUMENTS

| JP | 8-215572 A | 8/1996 |
| JP | 10-216509 A | 8/1998 |

(Continued)

OTHER PUBLICATIONS

English Abstract of JP2003126694 of record.
(Continued)

*Primary Examiner* — Cam N. Nguyen
(74) *Attorney, Agent, or Firm* — Sughrue Mion, PLLC

(57) ABSTRACT

A composite oxide with a high oxygen storage capacity is provided without using cerium. The composite oxide is an iron oxide-zirconia composite oxide containing iron, zirconium, and a rare-earth element. The total content of $Fe_2O_3$, $ZrO_2$, and an oxide of the rare-earth element is not less than 90 mass %, the content of an iron oxide in terms of $Fe_2O_3$ is 10 to 90 mass %, and the absolute value of the covariance COV (Fe, Zr+X) of the composite oxide, which has been baked in the atmosphere at a temperature of greater than or equal to 900° C. for 5 hours or more, is not greater than 20.

15 Claims, 22 Drawing Sheets

(51) Int. Cl.
- *B01J 23/10* (2006.01)
- *B01J 23/40* (2006.01)
- *B01J 23/42* (2006.01)
- *B01J 23/44* (2006.01)
- *B01J 23/56* (2006.01)
- *B01J 23/70* (2006.01)
- *B01J 23/74* (2006.01)
- *B01J 23/89* (2006.01)
- *B01J 35/00* (2006.01)
- *B01J 23/745* (2006.01)
- *B01J 23/83* (2006.01)
- *C01G 25/00* (2006.01)
- *C01G 49/00* (2006.01)
- *B01J 37/02* (2006.01)
- *B01J 37/03* (2006.01)

(52) U.S. Cl.
CPC ............ *B01J 35/0006* (2013.01); *C01G 25/00* (2013.01); *C01G 49/0018* (2013.01); *C01G 49/0054* (2013.01); *B01J 37/0248* (2013.01); *B01J 37/03* (2013.01); *C01P 2002/72* (2013.01); *C01P 2004/03* (2013.01); *C01P 2004/32* (2013.01); *C01P 2004/45* (2013.01); *C01P 2004/61* (2013.01); *C01P 2006/12* (2013.01)

(56) References Cited

U.S. PATENT DOCUMENTS

| | | | | |
|---|---|---|---|---|
| 6,797,668 | B2 * | 9/2004 | Yoshikawa | B01D 53/945 502/302 |
| 7,265,076 | B2 * | 9/2007 | Taguchi | B01J 21/066 502/304 |
| 7,314,816 | B2 * | 1/2008 | Liu | B81B 7/0041 257/E23.004 |
| 7,316,806 | B2 * | 1/2008 | Okuno | C01B 3/386 423/651 |
| 7,384,888 | B2 * | 6/2008 | Kuno | B01D 53/945 502/302 |
| 7,662,743 | B2 * | 2/2010 | Satoh | B01D 53/9422 502/302 |
| 7,740,817 | B2 * | 6/2010 | Matsumoto | B01D 53/94 422/177 |
| 8,101,539 | B2 * | 1/2012 | Yasuda | B01D 53/945 502/244 |
| 2007/0215009 | A1 * | 9/2007 | Shimazu | B01D 53/945 106/600 |
| 2008/0139382 | A1 | 6/2008 | Morisaka et al. | |
| 2009/0298673 | A1 | 12/2009 | Akamine et al. | |
| 2009/0325793 | A1 | 12/2009 | Takeshima et al. | |
| 2011/0245076 | A1 | 10/2011 | Matsueda et al. | |
| 2012/0027654 | A1 | 2/2012 | Mikita et al. | |

FOREIGN PATENT DOCUMENTS

| | | |
|---|---|---|
| JP | 2003-33669 A | 2/2003 |
| JP | 2003-126694 A | 5/2003 |
| JP | 2005-125317 A | 5/2005 |
| JP | 2007-301471 A | 11/2007 |
| JP | 2008-93496 A | 4/2008 |
| JP | 4666006 B2 | 4/2011 |
| WO | 2010101219 A1 | 9/2010 |

OTHER PUBLICATIONS

International Search Report for PCT/JP2013/062496 dated May 28, 2013 [PCT/ISA/210].

Written Opinion for PCT/JP2013/062496 dated May 28, 2013 [PCT/ISA/237].

* cited by examiner (a)

(b)

(a)

(b)

(a)

(b)

_US 9,387,464 B2_

IRON OXIDE-ZIRCONIA COMPOSITE OXIDE AND METHOD FOR PRODUCING SAME, AND EXHAUST GAS PURIFICATION CATALYST

CROSS REFERENCE TO RELATED APPLICATIONS

This application is a National Stage of International Application No. PCT/JP2013/062496, filed on Apr. 26, 2013, which claims priority from Japanese Patent Application Nos. 2012-102987, filed on Apr. 27, 2012, 2012-114390 and 2012-114291 both filed on May 18, 2012, and 2013-092232, filed on Apr. 25, 2013, the contents of all of which are incorporated herein by reference in their entirety.

TECHNICAL FIELD

The present invention relates to an iron oxide-zirconia composite oxide and a method for producing the same, and an exhaust gas purification catalyst containing such a composite oxide.

BACKGROUND ART

Conventionally, composite oxides containing various types of metal oxides have been used as supports or promoters of exhaust gas purification catalysts. As metal oxides contained in such composite oxides, ceria has been favorably used as it can absorb/release oxygen in accordance with the partial pressure of oxygen in the atmosphere (has an oxygen storage capacity). In recent years, various types of composite oxides containing ceria have been researched.

For example, JP H10-216509 A (Patent Literature 1) discloses a Fe-supported composite oxide with an oxygen storage capacity, which is obtained by causing Fe to be supported on a composite oxide containing Ce, Zr, and a rare-earth metal, JP 2003-33669 A (Patent Literature 2) discloses a promoter of an exhaust gas purification catalyst containing a composite oxide of Ce, Zr, and Fe, JP 2003-126694 A (Patent Literature 3) discloses an exhaust gas purification catalyst containing a Fe oxide-supported composite oxide, which is obtained by causing Fe oxide particles and a noble metal to be supported on a $CeO_2$—$ZrO_2$ composite oxide, and JP 2005-125317 A (Patent Literature 4) discloses an oxygen storage/release material containing an iron oxide-containing composite oxide obtained by causing an iron oxide to be supported on a support containing ceria.

Cerium contained in such composite oxides is expensive, and a problem has emerged that cerium is now difficult to obtain stably due to the deterioration of the procurement environment in recent years. Thus, suppressing the amount of cerium used is considered.

However, it is recognized by one of ordinary skill in the art that when the content of cerium is reduced in a composite oxide containing cerium and iron, the oxygen storage capacity would decrease as described in Patent Literature 1 to 4, while when the content of iron is increased, the oxygen storage capacity of the composite oxide would also decrease as described in Patent Literatures 2 to 4.

Meanwhile, JP 2008-93496 A (Patent Literature 5) discloses a promoter clathrate containing an iron oxide, which is a promoter of an exhaust gas purification catalyst, and a zirconia solid solution (e.g., Example 2). In such a promoter clathrate, the iron oxide is covered with the zirconia solid solution. Thus, sintering of the iron oxide is suppressed, and consequently, an exhaust gas purification catalyst containing such a promoter clathrate exhibits excellent catalyst activity.

CITATION LIST

Patent Literature

Patent Literature 1: JP 10-216509 A
Patent Literature 2: JP 2003-33669 A
Patent Literature 3: JP 2003-126694 A
Patent Literature 4: JP 2005-125317 A
Patent Literature 5: JP 2008-93496 A

SUMMARY OF INVENTION

Technical Problem

However, the oxygen storage capacity of the promoter clathrate described in Patent Literature 5 has not been necessarily sufficient.

The present invention has been made in view of the problems of the related art, and it is an object of the present invention to provide a composite oxide with a high oxygen storage capacity without using cerium, and a method for producing the same, and further, an exhaust gas purification catalyst containing such a composite oxide.

Solution to Problem

In order to achieve the aforementioned object, the inventors have conducted concentrated studies and arrived at the present invention by finding that an iron oxide-zirconia composite oxide with an excellent oxygen storage capacity can be obtained by mixing a zirconia sol water suspension with organic acid iron, thermally condensing the mixture, and baking the resulting gel.

That is, the iron oxide-zirconia composite oxide of the present invention is a composite oxide containing iron, zirconium, and a rare-earth element. The total content of $Fe_2O_3$, $ZrO_2$, and an oxide of the rare-earth element is not less than 90 mass %, the content of an iron oxide in terms of $Fe_2O_3$ is 10 to 90 mass %, and the absolute value of the covariance COV(Fe, Zr+X) of the composite oxide, which has been baked in the atmosphere at a temperature of greater than or equal to 900° C. for 5 hours or more, determined by the following Formulae (1) to (3), is not greater than 30 (preferably not greater than 20):

[Math. 1]

$$R_i(Fe) = \frac{I_i(Fe) \times 100}{I_i(Fe) + I_i(Zr) + I_i(X)} \quad (1)$$

$$R_i(Zr+X) = \frac{\{I_i(Zr) + I_i(X)\} \times 100}{I_i(Fe) + I_i(Zr) + I_i(X)} \quad (2)$$

$$COV(Fe, Zr+X) = \frac{1}{n}\sum_{i=1}^{n}[\{R_i(Fe) - R_{av}(Fe)\} \times \{R_i(Zr+X) - R_{av}(Zr+X)\}] \quad (3)$$

(In the formula, $I_i(Fe)$, $I_i(Zr)$, and $I_i(X)$ respectively represent the ratios of the X-ray intensities of iron, zirconium, and the rare-earth element measured at a measurement point i (where i=1 to n) to the 100% intensities of the respective elements as measured by subjecting the composite oxide to a ray analysis through EPMA (WDX: wavelength dispersive X-ray spectrometry) under conditions of an accelerating voltage of 15 kV, a sample current of 50 nA, a minimum beam diameter (not greater than 1 μm), and measurement intervals of 1 μm, where $R_{av}(Fe)$ and $R_{av}(Zr+X)$ represent the mean values of $R_i(Fe)$ and $R_i(Zr+X)$, respectively, at all measurement points n).

In the iron oxide-zirconia composite oxide of the present invention, the iron oxide in the composite oxide, which has been baked in the atmosphere at a temperature of greater than or equal to 900° C. for 5 hours or more, preferably includes hematite, or preferably includes lanthanum.

The iron oxide-zirconia composite oxide of the present invention containing lanthanum preferably contains at least one of a lanthanum-iron composite oxide or a lanthanum-zirconium composite oxide. In addition, the absolute value of the covariance COV(Fe, Zr+X) of the composite oxide, which has been baked in the atmosphere at 1100° C. for 10 hours, determined by Formulae (1) to (3) above, is preferably not greater than 20. Further, the atomic ratio of lanthanum to iron (La/Fe) is preferably not less than 1.1 and not greater than 2.1.

The iron oxide-zirconia composite oxide of the present invention preferably further contains yttrium. Such iron oxide-zirconia composite oxide of the present invention is preferably used as an oxygen storage material for an exhaust gas purification catalyst.

A method for producing the iron oxide-zirconia composite oxide of the present invention includes mixing a zirconia sol water suspension containing a rare-earth element with organic acid iron to attain a proportion in which the total content of $Fe_2O_3$, $ZrO_2$, and an oxide of the rare-earth element is not less than 90 mass %, and a content of an iron oxide in terms of $Fe_2O_3$ is 10 to 90 mass %; thermally condensing the resulting mixed solution; and baking the resulting gel.

The method for producing the iron oxide-zirconia composite oxide of the present invention further preferably includes mixing a lanthanum oxide into the mixed solution of the zirconia sol water suspension containing the rare-earth element and the organic acid iron.

It should be noted that the covariance COV(Fe, Zr+X) determined by Formulae (1) to (3) above is an index indicating the correlation between two data groups $R_i(Fe)$ and $R_i(Zr+X)$, and is evaluated as follows in the present invention. That is, first, a ray analysis is performed through EPMA (WDX: wavelength dispersive X-ray spectrometry) under the conditions of an accelerating voltage of 15 kV, a sample current of 50 nA, a minimum beam diameter (not greater than 1 inn), and measurement intervals of 1 μm. The number of all measurement points in the ray analysis is represented by "n." Next, at a measurement point i (where i=1 to n), the ratios $I_i(Fe)$, $I_i(Zr)$, and $I_i(X)$ of the X-ray intensities of iron, zirconium, and the rare-earth element to the 100% intensities of the respective elements are measured. That is, the intensity ratios of $I_i(Fe)$, $I_i(Zr)$, and $I_i(X)$ are determined by the following formulae: $I_i(Fe)$=(the X-ray peak intensity of iron at the measurement point i on the composite oxide)/(the X-ray peak intensity of the iron measured on the iron), $I_i(Zr)$=(the X-ray peak intensity of zirconium at the measurement point i on the composite oxide)/(the X-ray peak intensity of the zirconium measured on the zirconium), and $I_i(X)$=(the X-ray peak intensity of a rare-earth element measured at the measurement point i on the composite oxide)/(the X-ray peak intensity of the rare-earth element measured on the rare-earth metal).

Then, $R_i(Fe)$ and $R_i(Zr+X)$ at each measurement point i (where i=1 to n) are calculated from Formulae (1) to (2) above using the thus determined $I_i(Fe)$, $I_i(Zr)$, and $I_i(X)$, and further, the mean values $R_{av}(Fe)$ and $R_{av}(Zr+X)$ thereof at all measurement points n are determined. Then, the covariance COV(Fe, Zr+X) is determined from Formula (3) above using the thus determined $R_i(Fe)$, $R_i(Zr+X)$, $R_{av}(Fe)$, and $R_{av}(Zr+X)$.

A smaller absolute value of the covariance COV(Fe, Zr+X) means that each of $R_i(Fe)$ and $R_i(Zr+X)$ is concentrated at its given value, and thus, the iron oxide and the zirconia containing the rare-earth element (hereinafter also referred to as a "rare-earth-element-containing zirconia") uniformly covary (exhibit high covariance properties).

The reason that the method for producing the iron oxide-zirconia composite oxide of the present invention can form a composite oxide with an excellent oxygen storage capacity is not necessarily sure, but the inventors speculate the reason as follows. That is, in the method for producing the iron oxide-zirconia composite oxide of the present invention, first, a zirconia sol water suspension in which organic acid iron is dissolved is thermally condensed to form a gel, and then, the gel is baked. At this time, not only does the zirconia sol turn into a gel, but also an iron oxide precursor generated from the organic acid iron turns into a gel. Therefore, it is speculated that a state in which both the zirconia and the iron oxide are uniformly dispersed on a nanometer scale (a state in which the absolute value of the covariance COV(Fe, Zr+X) is small) is obtained, whereby a composite oxide with an excellent oxygen storage capacity is obtained.

In contrast, in the conventional sol-gel method or coprecipitation method, a solution in which an iron salt and a zirconium salt are dissolved is heated to from a mixture of an iron oxide and a zirconia sol, and further, the mixture is heated to turn the zirconia sol into a gel. At this time, the iron oxide undergoes grain growth along with the gelling of the zirconia sol. Thus, it is speculated that the dispersiveness of the iron oxide on a nanometer scale becomes low, and the absolute value of the covariance COV(Fe, Zr+X) becomes large, whereby the oxygen storage capacity of the resulting composite oxide becomes low.

Regarding the promoter clathrate disclosed in Patent Literature 5, the reason that a high oxygen storage capacity is not attained is not necessarily sure, but the inventors speculate the reason as follows. That is, the promoter clathrate is prepared by mixing a water suspension of an iron oxide with a zirconia-yttrium precursor cake. In such a preparation method, a zirconia layer grows in such a manner that it covers iron oxide particles. Thus, in the resulting promoter clathrate, the dispersiveness of at least one of the iron oxide or the zirconia on a nanometer scale is low, and the absolute value of the covariance COV(Fe, Zr+X) is large, whereby the oxygen storage capacity of the resulting composite oxide becomes low.

Advantageous Effects of Invention

According to the present invention, an iron oxide-zirconia composite oxide that exhibits a high oxygen storage capacity can be obtained without using cerium.

BRIEF DESCRIPTION OF DRAWINGS

FIG. 38(a) is a diagram showing the state in the lean air-fuel ratio region, and FIG. 38(b) is a diagram showing the state in the rich air-fuel ratio region.

FIG. 39(a) is a diagram showing the state in the lean air-fuel ratio region, and FIG. 39(b) is a diagram showing the state in the rich air-fuel ratio region.

DESCRIPTION OF EMBODIMENTS

Figure 1:
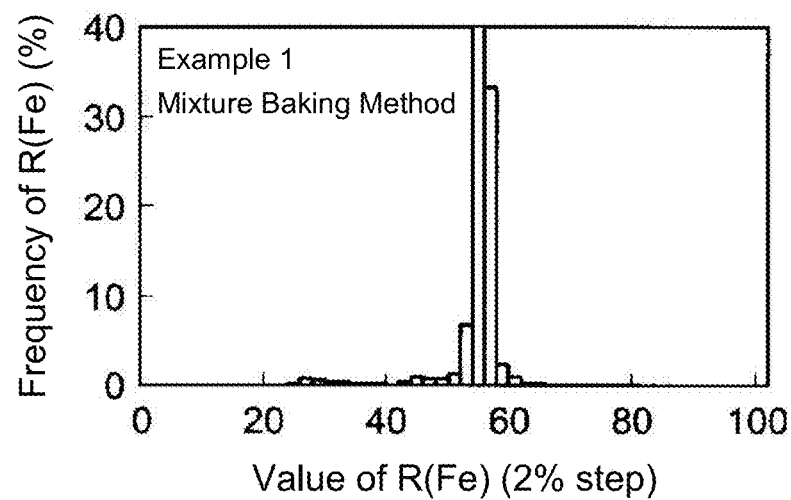
FIG. 1 is a graph showing the frequency distribution of the R (Fe) value of a composite oxide obtained in Example 1.
Figure 2:
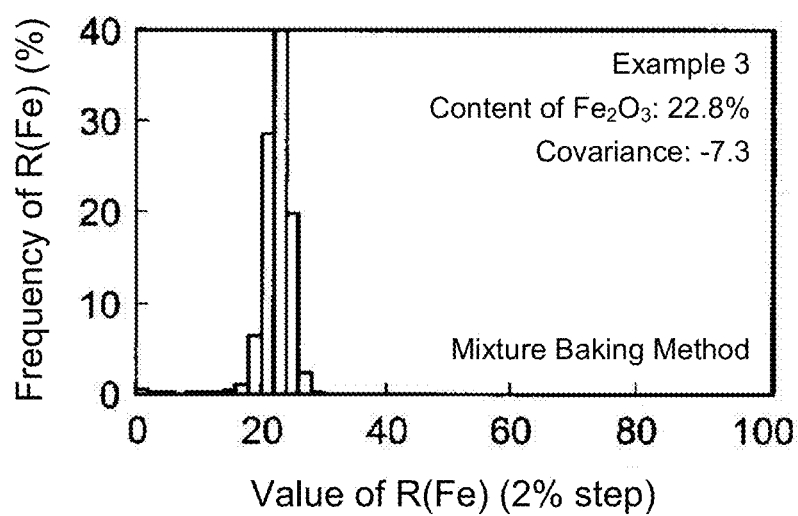
FIG. 2 is a graph showing the frequency distribution of the R (Fe) value of a composite oxide obtained in Example 3.
Figure 3:
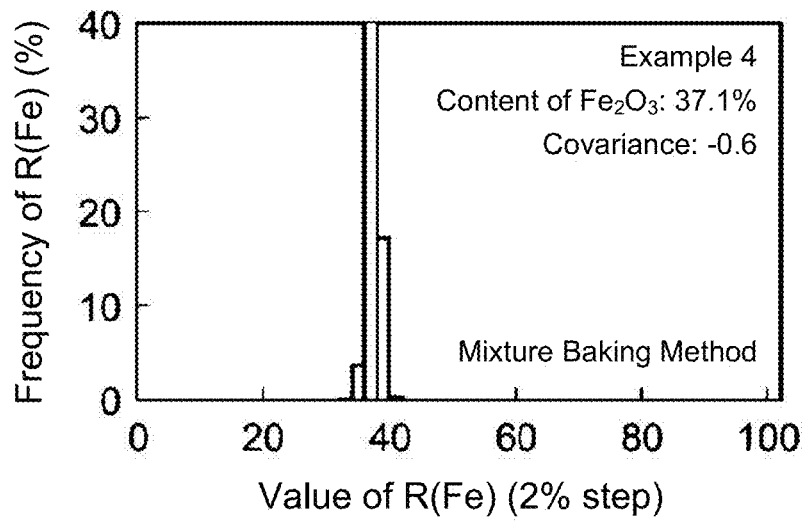
FIG. 3 is a graph showing the frequency distribution of the R (Fe) value of a composite oxide obtained in Example 4.
Figure 4:
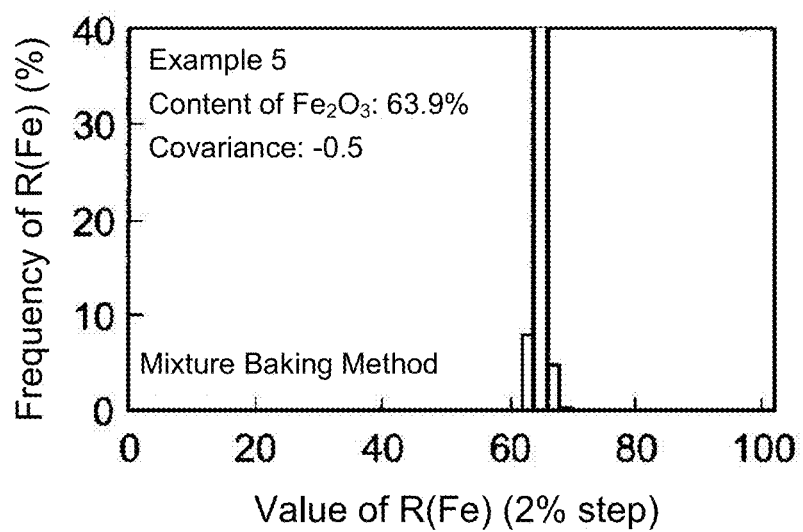
FIG. 4 is a graph showing the frequency distribution of the R (Fe) value of a composite oxide obtained in Example 5.
Figure 5:
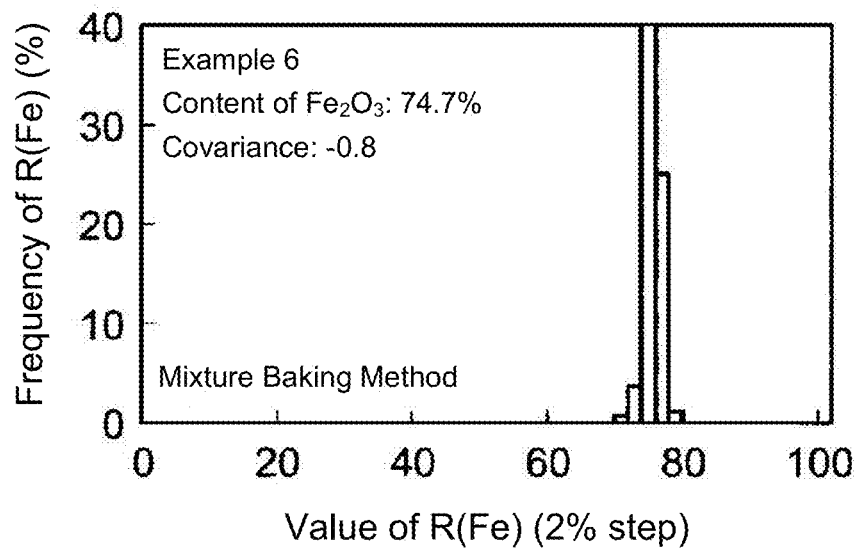
FIG. 5 is a graph showing the frequency distribution of the R (Fe) value of a composite oxide obtained in Example 6.
Figure 6:
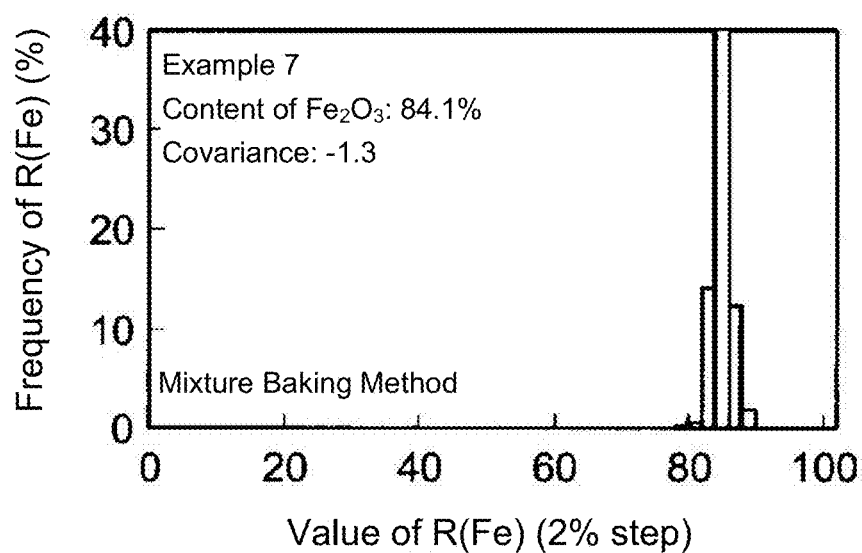
FIG. 6 is a graph showing the frequency distribution of the R (Fe) value of a composite oxide obtained in Example 7.
Figure 7:
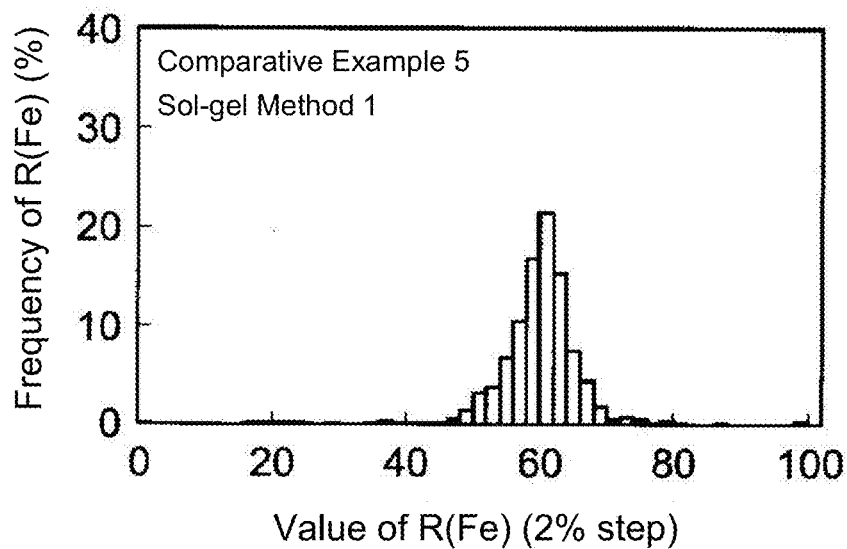
FIG. 7 is a graph showing the frequency distribution of the R (Fe) value of a composite oxide obtained in Comparative Example 5.
Figure 8:
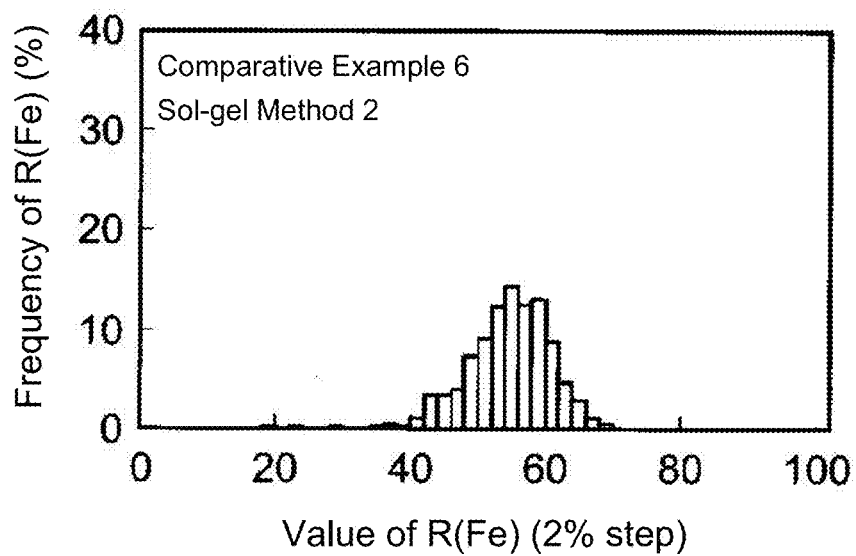
FIG. 8 is a graph showing the frequency distribution of the R (Fe) value of a composite oxide obtained in Comparative Example 6.
Figure 9:
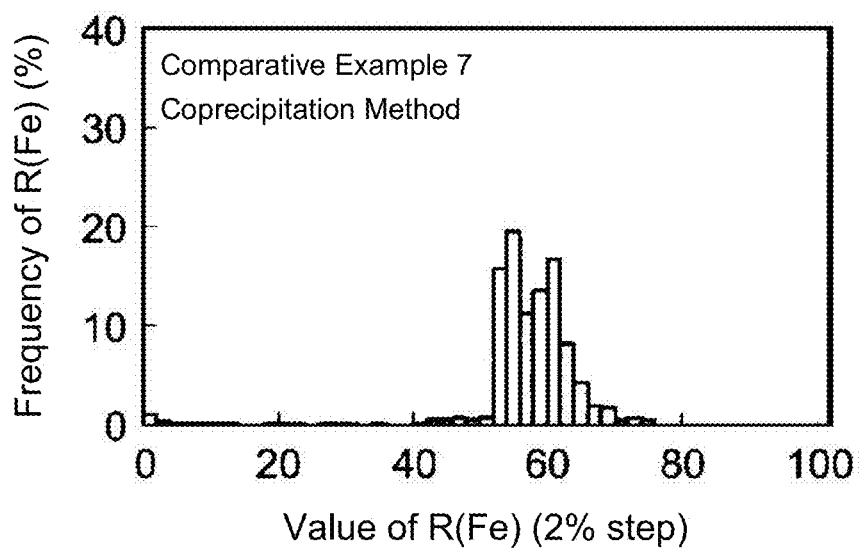
FIG. 9 is a graph showing the frequency distribution of the R (Fe) value of a composite oxide obtained in Comparative Example 7.
Figure 10:
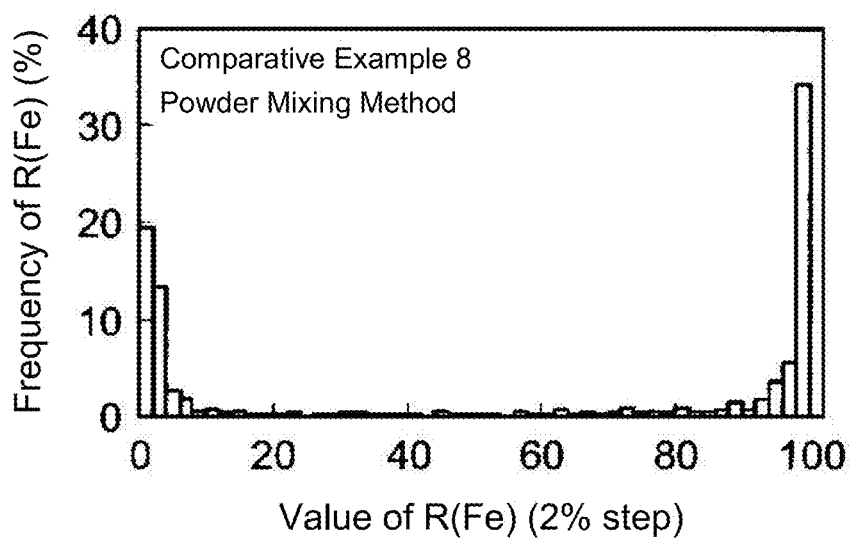
FIG. 10 is a graph showing the frequency distribution of the R (Fe) value of a composite oxide obtained in Comparative Example 8.

Hereinafter, the present invention will be described in detail along with the preferred embodiments thereof.

First, an iron oxide-zirconia composite oxide of the present invention will be described. The iron oxide-zirconia composite oxide of the present invention is a composite oxide containing iron, zirconium, and a rare-earth element. Further, the composite oxide of the present invention preferably contains lanthanum (La). In such composite oxides, the total content of $Fe_2O_3$, $ZrO_2$, and an oxide of the rare-earth element is not less than 90 mass %, and the content of an iron oxide in terms of $Fe_2O_3$ is 10 to 90 mass %. The absolute value of the covariance COV(Fe, Zr+X) of the composite oxide, which has been baked in the atmosphere at a temperature of greater than or equal to 900° C. for 5 hours or more, determined by the following Formulae (1) to (3), is not greater than 30:

[Math. 2]

$$R_i(Fe) = \frac{I_i(Fe) \times 100}{I_i(Fe) + I_i(Zr) + I_i(X)} \quad (1)$$

$$R_i(Zr + X) = \frac{\{I_i(Zr) + I_i(X)\} \times 100}{I_i(Fe) + I_i(Zr) + I_i(X)} \quad (2)$$

$$COV(Fe, Zr + X) = \quad (3)$$
$$\frac{1}{n}\sum_{i=1}^{n}[\{R_i(Fe) - R_{av}(Fe)\} \times \{R_i(Zr + X) - R_{av}(Zr + X)\}]$$

(In the formulae, $I_i(Fe)$, $I_i(Zr)$, and $I_i(X)$ respectively represent the ratios of the X-ray intensities of iron, zirconium, and the rare-earth element measured at a measurement point i (where i=1 to n) to the 100% intensities of the respective elements as measured by subjecting the composite oxide to a ray analysis through EPMA (WDX: wavelength dispersive X-ray spectrometry) under the conditions of an accelerating voltage of 15 kV, a sample current of 50 nA, a minimum beam diameter (not greater than 1 μm), and measurement intervals of 1 μm, where $R_{av}(Fe)$ and $R_{av}(Zr+X)$ represent the mean values of $R_i(Fe)$ and $R_i(Zr+X)$, respectively, at all measurement points n).

In the iron oxide-zirconia composite oxide of the present invention, the total content of $Fe_2O_3$, $ZrO_2$, and an oxide of the rare-earth element is not less than 90 mass %. If the total content of $Fe_2O_3$, $ZrO_2$, and an oxide of the rare-earth element is less than the lower limit, it would be difficult to achieve a high oxygen storage capacity (in particular, after an endurance test in the atmosphere at a high temperature (heating at 1000° C. for 5 hours)). Further, from a perspective of further increasing the oxygen storage capacity (in particular, the oxygen storage capacity after an endurance test in the atmosphere at a high temperature (heating at 1000° C. for 5 hours)), the total content of $Fe_2O_3$, $ZrO_2$, and an oxide of the rare-earth element is preferably greater than or equal to 95 mass %, more preferably greater than or equal to 98 mass %, and particularly preferably 100 mass %. It should be noted that in the iron oxide-zirconia composite oxide of the present invention, when $Fe_2O_3$ and $ZrO_2$ form a composite oxide together with a rare-earth element, the content of each of $Fe_2O_3$ and $ZrO_2$, and an oxide of the rare-earth element is a value obtained by converting the content of each of Fe, Zr, and the rare-earth element in the composite oxide into the content of each oxide that is stable in the atmosphere.

In the iron oxide-zirconia composite oxide of the present invention, the content of an iron oxide in terms of $Fe_2O_3$ is 10 to 90 mass %. When the content of an iron oxide in terms of $Fe_2O_3$ is outside such a range, it would be difficult to achieve a high oxygen storage capacity (in particular, after an endurance test (heating at a high temperature)). Further, from a perspective of further increasing the oxygen storage capacity (in particular, the oxygen storage capacity after an endurance test in the atmosphere at a high temperature)), the content of an iron oxide in terms of $Fe_2O_3$ is, if the composite oxide contains no La, preferably 20 to 90 mass %, and more preferably 20 to 70 mass %. Meanwhile, the content of an iron oxide in terms of $Fe_2O_3$ is, if the composite oxide contains La, preferably 10 to 45 mass %, and more preferably 10 to 35 mass %.

Further, in the iron oxide-zirconia composite oxide of the present invention, the absolute value of the covariance COV (Fe, Zr+X) of the composite oxide, which has been baked in the atmosphere at a temperature of greater than or equal to 900° C. for 5 hours or more, is not greater than 30. Although the baking conditions exemplarily shown herein are 900° C. for 5 hours and 1100° C. for 10 hours, the present invention is not limited thereto and 800° C. or greater is preferable. If the absolute value of the covariance COV(Fe, Zr+X) of the composite oxide, which has been baked under the aforementioned conditions, is above the upper limit, the covariance properties of the iron oxide and the zirconia containing the rare-earth element become low, and thus, it would be difficult to achieve a high oxygen storage capacity (in particular, after an endurance test at a high temperature). Further, from a perspective of further increasing the covariance properties of the iron oxide and the zirconia containing the rare-earth element, and thus further increasing the oxygen storage capacity (in particular, the oxygen storage capacity after an endurance test in the atmosphere at a high temperature), the absolute value of the covariance COV(Fe, Zr+X) of the composite oxide, which has been baked under the aforementioned conditions, is preferably not greater than 20, and more preferably not greater than 10.

The iron oxide-zirconia composite oxide of the present invention preferably contains hematite (α-$Fe_2O_3$) if La is not contained as the iron oxide contained in the composite oxide obtained after baking is performed in the atmosphere at a temperature of greater than or equal to 900° C. for 5 hours or more. When the iron oxide contained in the composite oxide after the baking includes hematite, a change in the oxygen storage capacity tends to become smaller before and after an endurance test in the reducing atmosphere and/or the atmosphere at a high temperature. Therefore, when the iron oxide-zirconia composite oxide of the present invention containing hematite is used as a catalyst material, there is an advantage that only a small change in the properties occurs and the composite oxide is easy to use. From such perspective, it is particularly preferable that all of iron oxides contain hematite. Meanwhile, when the composite oxide of the present invention contains La, a composite oxide containing $LaFeO_3$ is preferably used, and it is particularly preferable that all of iron oxides be $LaFeO_3$.

In the iron oxide-zirconia composite oxide of the present invention, it is preferable that a rare-earth element be contained, and zirconia and an oxide of the rare-earth element be dissolved in order to increase the heat resistance of the zirconia and achieve a high oxygen storage capacity even after an endurance test in the atmosphere at a high temperature. Examples of such rare-earth element include scandium (Sc), yttrium (Y), lanthanum (La), cerium (Ce), praseodymium (Pr), neodymium (Nd), samarium (Sm), gadolinium (Gd), terbium (Tb), dysprosium (Dy), ytterbium (Yb), and lutetium (Lu). Although Ce may be used, using a rare-earth element other than Ce is preferable from a perspective of reducing the amount of Ce used, and using La, Y, Nd, Pr, or Sr is more preferable, and using La or Y is further preferable, and using La is particularly preferable from a perspective of improving the stability (thermal stability) of zirconia. Such a rare-earth elements may be used either alone or in combination of two or more. It is further preferable that both La and Y be contained.

When the iron oxide-zirconia composite oxide of the present invention contains lanthanum (La), not only does the heat resistance of the zirconia improve, but also the heat resistance of the iron oxide tends to improve as described below. That is, even when the iron oxide-zirconia composite oxide containing La of the present invention is exposed to a high-temperature (e.g., a high temperature of 1000° C. or greater (further preferably 1050° C. or greater)) atmosphere in which oxidation and reduction are vigorously repeated with the coexistence with alumina), diffusion of iron atoms in the alumina support is suppressed, and thus, a high oxygen storage capacity tends to be exhibited. Further, when a noble metal is supported on the alumina, deactivation of the noble metal catalyst due to iron atoms also tends to be suppressed. Further, when (Ce, Zr) Ox is made to co-exist with alumina, a decrease in the specific surface area of the (Ce, Zr) Ox can be prevented.

In such an iron oxide-zirconia composite oxide of the present invention containing La, it is preferable that the composite oxide, which has been baked in the atmosphere at a temperature of greater than or equal to 900° C. for 5 hours or more, contain at least one of a lanthanum-iron composite oxide or a lanthanum-zirconium composite oxide. When the composite oxide after the baking contains at least one of a lanthanum-iron composite oxide or a lanthanum-zirconium composite oxide, the particle size of the primary particles becomes small even after the composite oxide is exposed to a high-temperature atmosphere in which oxidation and reduction are vigorously repeated, and thus, an iron oxide-zirconia composite oxide with a large specific surface area can be obtained. Such an iron oxide-zirconia composite oxide tends to exhibit a high oxygen storage capacity (in particular, after an endurance test at a high temperature). Further, when the composite oxide after the baking contains a lanthanum-iron composite oxide, even if the composite oxide is exposed to a high-temperature (e.g., greater than or equal to 1000° C.) atmosphere with the co-existence with alumina, diffusion of iron atoms in the alumina is suppressed sufficiently, and thus, a high oxygen storage capacity tends to be exhibited.

Further, in the iron oxide-zirconia composite oxide of the present invention containing La, the absolute value of the covariance COV(Fe, Zr+X) of the composite oxide, which has been baked in the atmosphere at 1100° C. for 10 hours, determined by Formulae (1) to (3) above, is preferably not greater than 20, and more preferably not greater than 10. If the absolute value of the covariance COV(Fe, Zr+X) of the composite oxide baked under such conditions is above the upper limit, the covariance properties of the iron oxide and the zirconia containing the rare-earth element become low, and thus, a high oxygen storage capacity tends to become difficult to achieve after an endurance test at a high temperature (e.g., greater than or equal to 1000° C.).

In the iron oxide-zirconia composite oxide of the present invention containing La, the atomic ratio of lanthanum to iron (La/Fe) is preferably not less than 1.1 (more preferably not less than 1.2) and not greater than 2.1 (more preferably not greater than 2.05, and further preferably not greater than 2.0). If the atomic ratio of La/Fe is below the lower limit, the content of the iron oxide that is not composited with La becomes high, and if the composite oxide is exposed to a high-temperature (e.g., greater than or equal to 1000° C.) atmosphere with the co-existence with alumina, diffusion of iron atoms in the alumina cannot be suppressed sufficiently, and thus, a high oxygen storage capacity tends to become difficult to achieve. Meanwhile, if the atomic ratio of La/Fe is above the upper limit, $La_2O_3$ tends to become easily deposited. When such $La_2O_3$ is dissolved in a slurry containing the composite oxide, the viscosity of the slurry is increased, whereby it becomes difficult for a support such as a honeycomb to be coated with the slurry. Further, La, which is dissolved in a slurry, tends to decrease the activity of a noble metal catalyst such as Rh. Further, when $La_2O_3$ is dissolved in a slurry, the composite oxide will be finely divided into powder, and iron will be highly dispersed in the slurry. From such perspective, a composite oxide containing $La_2O_3$ is not preferable.

As the content of the rare-earth element other than La in the iron oxide-zirconia composite oxide of the present invention, the content of an oxide of the rare-earth element is preferably not less than 0.5 mass %, more preferably not less than 1 mass %, and particularly preferably not less than 2 mass %. If the content of the rare-earth element other than La is below the lower limit, the heat resistance of the zirconia becomes low, and thus, a high oxygen storage capacity tends to become difficult to achieve after an endurance test at a high temperature. Meanwhile, as the upper limit of the content of the rare-earth element other than La, the content of an oxide of the rare-earth element is preferably not greater than 20 mass %, and more preferably not greater than 15 mass %, and particularly preferably not greater than 10 mass %. If the content of the rare-earth element other than La is above the upper limit, a high oxygen storage capacity (in particular, after an endurance test at a high temperature) tends to become difficult to achieve when the rare-earth element is an element other than Ce, while the object of reducing the amount of Ce used cannot be achieved when the rare-earth element is Ce.

The shape of the iron oxide-zirconia composite oxide of the present invention is not particularly limited, but may be in a particulate form (e.g., a spherical form), a massive form, and the like, for example. When the composite oxide contains particles, the mean particle size thereof is not particularly limited, but is preferably 1 to 200 µm, and more preferably 2 to 100 If the mean particle size is below the lower limit, when the composite oxide is mixed with another material, interdiffusion between iron in the composite oxide and the other material tends to easily occur. Meanwhile, if the mean particle size is above the upper limit, the composite oxide tends to become less easily catalyzed. In order to surely suppress diffusion of iron in the other material, it is more preferable to remove particles of several µm to set the mean particle size to not less than 8 µm, further preferably not less than 10 µm, particularly preferably not less than 15 µm, and most preferably not less than 20 µm. In addition, in order to suppress a decrease in the coatability of the support and prevent clogging, it is preferable to set the mean particle size to about a level that allows easy coating and prevents diffusion (more preferably not greater than 50 µm, and further preferably not greater than 30 µm). It is also possible to adjust pH by adding acetic acid, oxalic acid, citric acid, nitric acid, amino acid, ammonia water, or the like as needed.

The specific surface area of the iron oxide-zirconia composite oxide of the present invention is not particularly limited, but is preferably 0.5 to 100 m²/g, and more preferably 1 to 50 m²/g. If the specific surface area is below the lower limit, a high oxygen storage capacity (in particular, after an endurance test at a high temperature) tends to become difficult to achieve, while if the specific surface area is above the upper limit, a change in state after an endurance test at a high temperature becomes large.

Next, a method for producing the iron oxide-zirconia composite oxide of the present invention (hereinafter also referred to as a "method for producing the composite oxide of the present invention") will be described. The method for producing the composite oxide of the present invention is a method that includes mixing a zirconia sol water suspension containing a rare-earth element with organic acid iron to attain a proportion in which the total content of $Fe_2O_3$, $ZrO_2$, and an oxide of the rare-earth element in the resulting composite oxide as well as the content of an iron oxide in terms of $Fe_2O_3$ falls within a predetermined range (a mixing step), thermally condensing the resulting mixed solution (a thermal condensation step), and further baking the resulting gel (a baking step).

First, materials used for the method for producing the composite oxide of the present invention will be described. A zirconia sol water suspension used in the method for producing the composite oxide of the present invention is a water suspension of a zirconia sol containing an oxide of the aforementioned rare-earth element. When a water suspension of a zirconia sol is used, the zirconia sol will turn into a gel, and an iron oxide precursor generated from organic acid iron will also turn into a gel through the thermal condensation described below. Thus, a composite oxide with a high oxygen storage capacity is obtained in which zirconia and an iron oxide are uniformly dispersed on a nanometer scale (in a state in which the absolute value of the covariance COV(Fe, Zr+X) is small). Meanwhile, when zirconium atoms or a zirconium salt are/is used as a material of zirconia instead of the zirconia sol, if the amount of addition (content) of a re-earth element is small, the rare-earth element that is added to improve the heat resistance of the resulting zirconia will react with iron, thereby forming a composite oxide. Thus, the heat resistance of the zirconia and the iron oxide will be low, and thus, it becomes difficult to achieve a high oxygen storage capacity after an endurance test in the atmosphere at a high temperature.

Since the zirconia sol used in the method for producing the composite oxide of the present invention contains an oxide of a rare-earth element, the heat resistance of zirconia in the resulting composite oxide improves, and thus, a high oxygen storage capacity can be achieved even after an endurance test in the atmosphere at a high temperature (heating at 1000° C. for 5 hours). From a perspective of further improving the heat resistance of the zirconia, and thus achieving a high oxygen storage capacity after an endurance test in the atmosphere at a high temperature, it is preferable that the zirconia and the oxide of the rare-earth element be dissolved. It should be noted that the zirconia sol may contain either one or more than one oxides of rare-earth elements.

The content of such oxide of the rare-earth element is preferably 3 to 30 parts by mass, more preferably 5 to 25 parts by mass, or particularly preferably 10 to 20 parts by mass with respect to 100 parts by mass of the zirconia sol. If the content of the oxide of the rare-earth element is below the lower limit, the heat resistance of zirconia becomes low, and thus, a high oxygen storage capacity tends to become difficult to achieve after an endurance test at a high temperature. Meanwhile, if the content of the oxide of the rare-earth element is above the upper limit, a high oxygen storage capacity (in particular, after an endurance test at a high temperature) tends to become difficult to achieve when the rare-earth element is an element other than Y, while the object of reducing the amount of Ce used cannot be achieved when the rare-earth element is Ce.

The particle size of the zirconia sol in accordance with the present invention is preferably 10 to 100 nm, and more preferably 30 to 80 nm. If the particle size of the zirconia sol is below the lower limit, a gel with a small particle size will be generated in the thermal condensation described below, but the gel tends to become aggregated during baking. Meanwhile, if the particle size of the zirconia sol is above the upper limit, the particle size of the resulting zirconia gel tends to become large. Consequently, in the resulting composite oxides in both cases, the dispersiveness of zirconia on a nanometer scale is low, and the absolute value of the covariance COV(Fe, Zr+Y) is large. Thus, the oxygen storage capacity tends to become low.

The content of the zirconia sol in such a zirconia sol water suspension is preferably 5 to 40 mass %, more preferably 10 to 40 mass %, and further preferably 20 to 35 mass %. If the content of the zirconia sol is below the lower limit, a cost required for the thermal condensation described below tends to increase. Meanwhile, if the content of the zirconia sol is above the upper limit, secondary aggregation of the zirconia sol is likely to occur, and thus, a gel with a large particle size is generated. Thus, in the resulting composite oxide, the dispersiveness of zirconia on a nanometer scale is low, and the absolute value of the covariance COV(Fe, Zr+Y) is large. Thus, the oxygen storage capacity tends to become low. Further, from a perspective of obtaining a composite oxide that exhibits a high oxygen storage capacity, the zirconia sol water suspension is preferably alkaline, and more preferably has pH 8 to 10, and further preferably has pH 9 to 10.

The organic acid iron used for the method for producing the composite oxide of the present invention is not particularly limited as long as it is a salt (which includes a complex salt) of organic acid (e.g., carboxylic acid such as citric acid or fumaric acid) and iron ions. For example, ammonium iron (III) citrate can be used. Since such organic acid iron has high solubility in water, it can be directly added to the zirconia sol water suspension to dissolve therein. However, it may also be mixed with a zirconia sol water suspension as an aqueous solution of organic acid iron.

Next, each step of the method for producing the composite oxide of the present invention will be described. In the method for producing the composite oxide of the present invention, a water suspension of a zirconia sol containing a rare-earth element is mixed with organic acid iron. Accordingly, the organic acid iron dissolves to generate an iron oxide precursor. At this time, a small amount of water may be added to sufficiently dissolve the organic acid iron. In addition, in order to uniformly disperse the iron oxide precursor and the zirconia sol in the mixed solution, agitation is preferably performed using a propeller agitator, various types of homogenizers, or various types of mills, and more preferably, agitation is performed using a propeller agitator, a homogenizer (e.g., an ultrasonic homogenizer) and/or a ball mill, an attritor, or the like in combination.

The concentration of the zirconia sol containing a rare-earth element in the mixed solution is preferably 5 to 40 mass % in solid content concentration. If the concentration of the zirconia sol in the mixed solution is below the lower limit, a cost required for the thermal condensation described below tends to increase. Meanwhile, if the concentration of the zirconia sol in the mixed solution is above the lower limit, secondary aggregation of the zirconia sol is likely to occur, and thus, a gel with a large particle size is generated. Thus, in the resulting composite oxide, the dispersiveness of zirconia on a nanometer scale is low, and the absolute value of the covariance COV(Fe, Zr+Y) is large. Thus, the oxygen storage capacity tends to become low.

The mixture proportion of the zirconia sol containing a rare-earth element and the organic acid iron is determined so that the total content of $Fe_2O_3$, $ZrO_2$, and an oxide of the rare-earth element in the resulting composite oxide as well as the content of an iron oxide in terms of $Fe_2O_3$ falls within a predetermined range.

In the method for producing the composite oxide of the present invention, a suspension (a dispersion liquid) of lanthanum oxide fine particles is preferably mixed into a mixed solution of a zirconia sol water suspension containing a rare-earth element and organic acid iron. Accordingly, the heat resistance of an iron oxide in the resulting composite oxide improves, and even when the composite oxide is exposed to a high-temperature (e.g., 1000° C. or greater) atmosphere with the co-existence with alumina, diffusion of iron atoms in the alumina is sufficiently suppressed, whereby an iron oxide-zirconia composite oxide that exhibits a high oxygen storage capacity can be obtained.

Examples of a suspension medium (a dispersion liquid) that is used for the suspension (the dispersion liquid) of lanthanum oxide fine particles include water. The mixture proportion of the lanthanum oxide fine particles is determined so that the total content of $Fe_2O_3$, $ZrO_2$, and an oxide of the rare-earth element (which includes a lanthanum oxide) in the resulting composite oxide as well as the content of an iron oxide in terms of $Fe_2O_3$ falls within a predetermined range. A mixing method is not particularly limited, but it is preferable to perform propeller agitation, and then further perform agitation using a homogenizer or various types of mills.

Next, the thus obtained mixed solution is thermally condensed. Accordingly, the zirconia sol turns into a sol, and the iron oxide precursor also turns into a gel. For example, the bottom of a container is heated to a temperature of about 150 to 350° C. while the mixed solution (the water suspension) is agitated so that water vaporizes and condensation occurs. At a point in time when the viscosity of the mixed solution (concentrate) has become high (e.g., at a point in time when it becomes difficult to perform agitation any further), the concentrate is heated to a temperature of about 100 to 200° C. to sufficiently vaporize water. Accordingly, not only does the water vaporize but also the zirconia sol turns into a gel, and a gel of the iron oxide precursor is generated. In the method for producing the composite oxide of the present invention, the zirconia sol is turned into a gel while at the same time a gel of the iron oxide precursor is formed through such thermal condensation. Thus, it is estimated that both the zirconia containing the rare-earth element and the iron oxide are uniformly dispersed on a nanometer scale (are in a state in which the absolute value of the covariance COV(Fe, Zr+X) is small), and thus a composite oxide with an excellent oxygen storage capacity is obtained. It should be noted that if the concentrate is heated to a temperature of greater than or equal to 250° C. to generate dry powder in the initial stage, dispersion of the precursor starts. Thus, as described above, it is preferable to heat the concentrate to a temperature of about 100 to 200° C. to sufficiently vaporize water, and then disperse the precursor.

Next, pre-baking is performed in the atmosphere to completely oxidize the thus obtained composite oxide containing the gel of the zirconia containing the rare-earth element and the gel of the iron oxide precursor. The temperature of the pre-baking is not particularly limited, but is typically about 150 to 600° C. Then, the resulting composite oxide is baked at a temperature of about 700 to 1300° C. (preferably 800 to 1200° C., and more preferably 850 to 1150° C.), so that the iron oxide-zirconia composite oxide of the present invention is obtained. The baking temperature is not particularly limited, but is preferably as high as possible from a perspective of increasing the primary particle size and improving the thermal stability of the resulting composite oxide. In addition, when a lanthanum oxide is mixed, a lanthanum-iron composite oxide or a lanthanum-zirconium composite oxide tends to be generated by this baking.

Next, the oxygen storage material and the exhaust gas purification catalyst of the present invention will be described. The oxygen storage material of the present invention includes the iron oxide-zirconia composite oxide of the present invention. As described above, the iron oxide-zirconia composite oxide of the present invention has a high oxygen storage capacity. Thus, using such a composite oxide as the oxygen storage material can obtain a high oxygen storage capacity without using cerium. In particular, an oxygen storage material made of a lanthanum-containing iron oxide-zirconia composite oxide exhibits an excellent oxygen storage capacity even when it is exposed to a high-temperature (e.g., 1000° C.) atmosphere.

The exhaust gas purification catalyst of the present invention contains the oxygen storage material of the present invention and a noble metal. As described above, since the oxygen storage material of the present invention has a high oxygen storage capacity, the exhaust gas purification catalyst of the present invention exhibits high catalyst activity. In particular, an exhaust gas purification catalyst containing an oxygen storage material, which is made of a lanthanum-containing iron oxide-zirconia composite oxide, exhibits excellent catalyst activity even when it is exposed to a high-temperature (e.g., 1000° C. or greater) atmosphere since the oxygen storage capacity of the oxygen storage material is maintained high.

Examples of a noble metal used for such an exhaust gas purification catalyst include platinum, rhodium, palladium, osmium, iridium, gold, and silver. Such a noble metal is usually used by being supported on an alumina support or a (Ce, Zr) Ox support. If a noble metal supported on an alumina support is used for the exhaust gas purification catalyst of the present invention, it is preferable to use an oxygen storage material containing a lanthanum-containing iron oxide-zirconia composite oxide. In the lanthanum-containing iron oxide-zirconia composite oxide, the iron oxide and the lanthanum form the composite oxide. Thus, even if such a composite oxide is exposed to a high-temperature (e.g., 1000° C. or greater) atmosphere with the co-existence with an alumina support or a (Ce, Zr) Ox support, diffusion of iron atoms in the alumina support or the (Ce, Zr) Ox support is sufficiently suppressed, whereby a high oxygen storage capacity of the oxygen storage material and high activity of the exhaust gas purification catalyst can be maintained.

Examples of Composite Oxide

Although the iron oxide-zirconia composite oxide of the present invention will be described more specifically with reference to examples and comparative examples, the present invention is not limited thereto.

Example 1

Production of an Iron Oxide-Zirconia Composite Oxide Using a Mixture Baking Method 333.8 g ammonium iron(III) citrate (produced by Wako Pure Chemical Industries, Ltd., reagent, brown, and the iron content: 16 to 19%), a 223.5 g water-dispersible yttria-containing alkaline zirconia sol ("NanoUse ZR30-BS" produced by Nissan Chemical Industries, Ltd., the sol particle size: 30 to 80 nm, the solid content concentration of $ZrO_2$: 30.8%, and Zr:Y (atomic ratio)=1:0.109, tetramethylammonium hydroxide (TMAH) contained), and 179.1 g distilled water were poured into a polyethylene beaker with a size of 1 L. Table 1 shows the atomic ratio, the content of $Fe_2O_3$, the content of $ZrO_2$, and the content of $Y_2O_3$ of a composite oxide calculated from such amounts of the prepared materials.

The mixture was sufficiently agitated with a propeller agitator, and further, 1-minute agitation was performed three times with a homogenizer ("T25" produced by IKA, with the use of a shaft generator "S25N-25F" produced by IKA) at a number of revolutions of 20000 rpm. Then, suction filtration was performed using filter paper (No. 5C, the particle retention capacitance: 2.5 μm, and the diameter: 70 mmφ), so that impurities were removed, and an yttria-containing zirconia sol water suspension having dissolved therein ammonium iron(III) citrate was collected into a glass beaker with a size of 1 L.

The water suspension was heated to a temperature of 250° C. on a hot stirrer while being agitated with a propeller agitator coated with Teflon (registered trademark), whereby the water suspension was condensed. Agitation was stopped before the viscosity of the water suspension increased to such a level that it would become difficult to further agitate the water suspension. Then, the resulting concentrate was put into a dryer at 120° C. together with the propeller blade, and was dried for 12 hours or more. All portions of the obtained powder were put into three 280 ml crucibles, and the crucibles were put into a saggar with lids of the crucibles open by about 1/10 to 1/5 so as to completely oxidize the powder. Then, the saggar was put into a degreasing furnace that allows circulation of the atmosphere, and the powder was pre-baked in the atmosphere under the conditions of 150° C. for 3 hours→250° C. for 2 hours→400° C. for 2 hours→500° C. for 5 hours. The total amount of the powder after the pre-baking was about 158 g.

After that, at a point in time when the temperature of the degreasing furnace had become less than or equal to 150° C., the saggar was taken out of the degreasing furnace, and all of the powder in the three crucibles were collected into one. Then, the powder was ground with a mortar down to a size of less than or equal to 100 meshes (150 μm sq.). The thus obtained ground product was put into a crucible with a size of 280 ml, and the crucible was put into a box electric furnace with a lid of the crucible open by about 1/10 to 1/5, so that the ground product was baked in the atmosphere at 900° C. for 5 hours to obtain about a 152 g composite oxide powder.

Examples 2 to 7

Production of Iron Oxide-Zirconia Composite Oxides Using a Mixture Baking Method Composite oxide powder was obtained in the same way as in Example 1 except that the amounts of ammonium iron(III) citrate, a water-dispersible yttria-containing alkaline zirconia sol, and distilled water were changed to satisfy the atomic ratio of iron, zirconium, and yttrium shown in Table 1. The mixed amount of each material was adjusted so as to obtain 75 to 150 g composite oxide powder. In addition, the agitation time (the number of agitations) of the homogenizer was adjusted in accordance with the amount of the mixture. Table 1 shows the content of $Fe_2O_3$, the content of $ZrO_2$, and the content of $Y_2O_3$ of a composite oxide calculated from such amounts of the prepared materials.

Comparative Examples 1 to 4

Production of Iron Oxide-Zirconia Composite Oxides Using a Mixture Baking Method Yttria-containing zirconia powder (Comparative Example 1), composite oxide powder (Comparative Examples 2 to 3), and iron oxide(III) powder (Comparative Example 4) were obtained in the same way as in Example 1 except that the amounts of ammonium iron(III) citrate, a water-dispersible yttria-containing alkaline zirconia sol, and distilled water were changed to satisfy the atomic ratio of iron, zirconium, and yttrium shown in Table 1. The mixed amount of each material was adjusted so as to obtain 75 to 150 g powder. In addition, the agitation time (the number of agitations) of the homogenizer was adjusted in accordance with the amount of the mixture. Table 1 shows the content of $Fe_2O_3$, the content of $ZrO_2$, and the content of $Y_2O_3$ of a composite oxide calculated from such amounts of the prepared materials.

Comparative Example 5

Production of an Iron Oxide-Zirconia Composite Oxide Using a Sol-Gel Method (1)

378.3 g iron(III)tris(2-ethylhexanoate), mineral spirit solution (produced by Wako Pure Chemical Industries, Ltd., reagent, the iron content: 6%), a 91.7 g 85% zirconium(IV) butoxide 1-butanol solution (produced by Wako Pure Chemical Industries, Ltd., reagent), and a 39.39 g yttrium naphthenate toluene solution (produced by Wako Pure Chemical Industries, Ltd., reagent, and the yttrium content: 5%) were poured into a glass beaker with a size of 1 L. Table 1 shows the atomic ratio, the content of $Fe_2O_3$, the content of $ZrO_2$, and the content of $Y_2O_3$ of a composite oxide calculated from such amounts of the prepared materials. The collected amount of the composite oxide converted from the amounts of the prepared materials was about 60 g.

Figure 20:
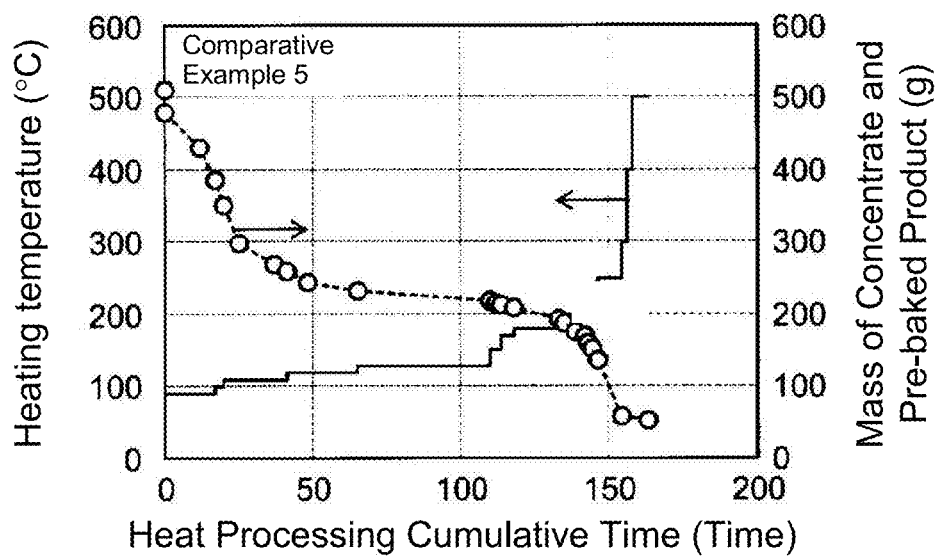
FIG. 20 is a graph showing the temperature history and a change with time of the mass of a concentrate and a pre-baked product during thermal condensation and pre-baking in Comparative Example 5.
Figure 21:
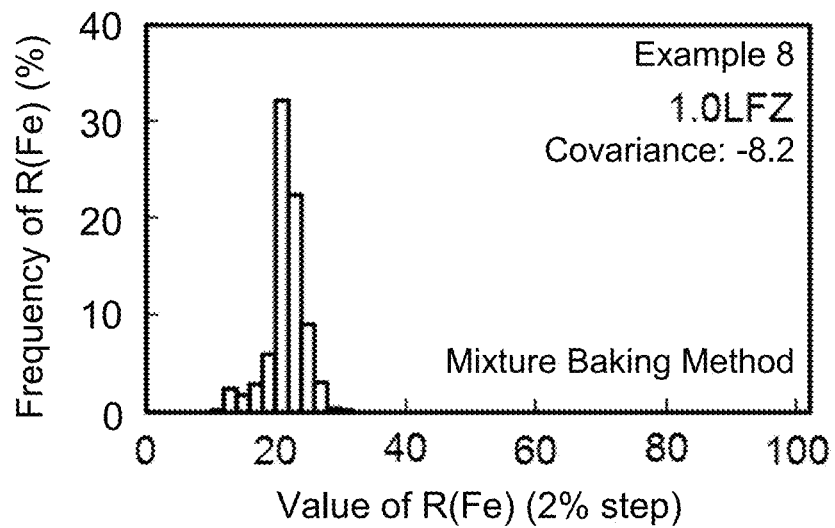
FIG. 21 is a graph showing the frequency distribution of the R (Fe) value of a lanthanum-containing composite oxide obtained in Example 8.
Figure 22:
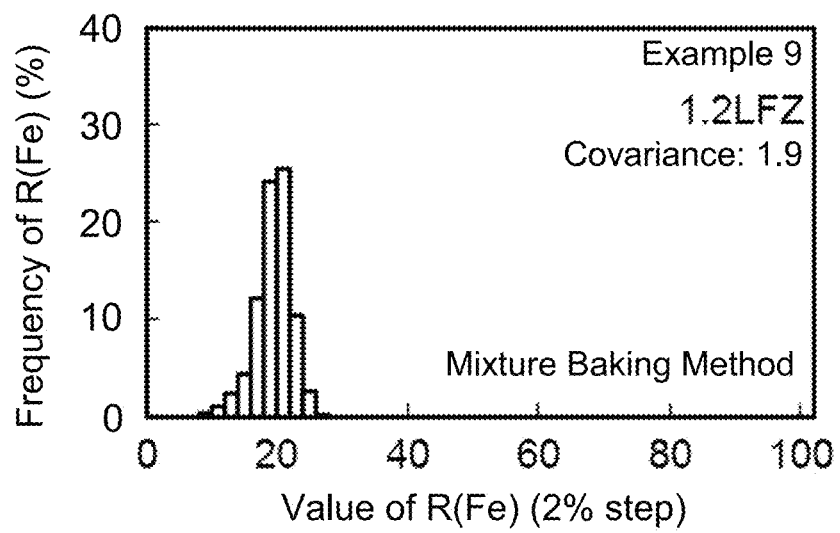
FIG. 22 is a graph showing the frequency distribution of the R (Fe) value of a lanthanum-containing composite oxide obtained in Example 9.
Figure 23:
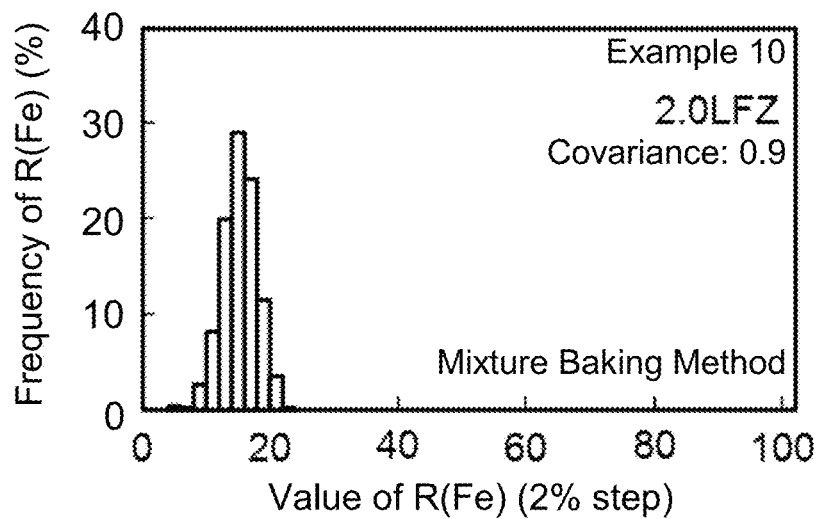
FIG. 23 is a graph showing the frequency distribution of the R (Fe) value of a lanthanum-containing composite oxide obtained in Example 10.
Figure 24:
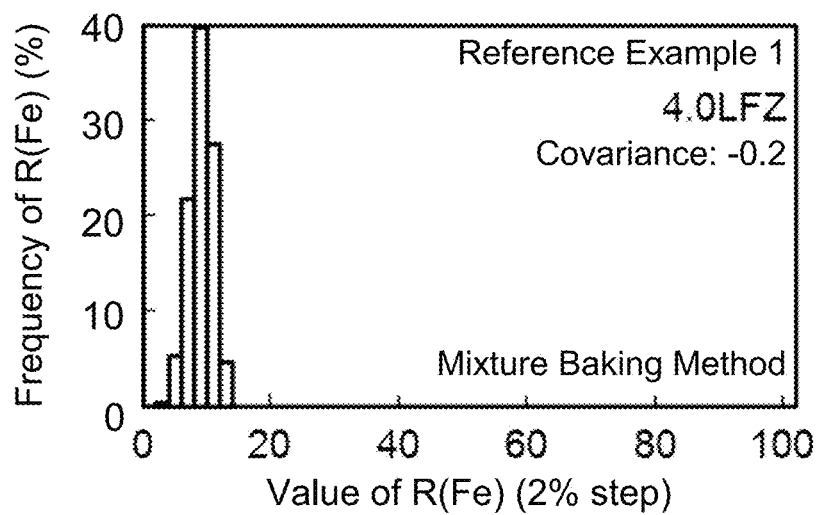
FIG. 24 is a graph showing the frequency distribution of the R (Fe) value of a lanthanum-containing composite oxide obtained in Reference Example 1.
Figure 25:
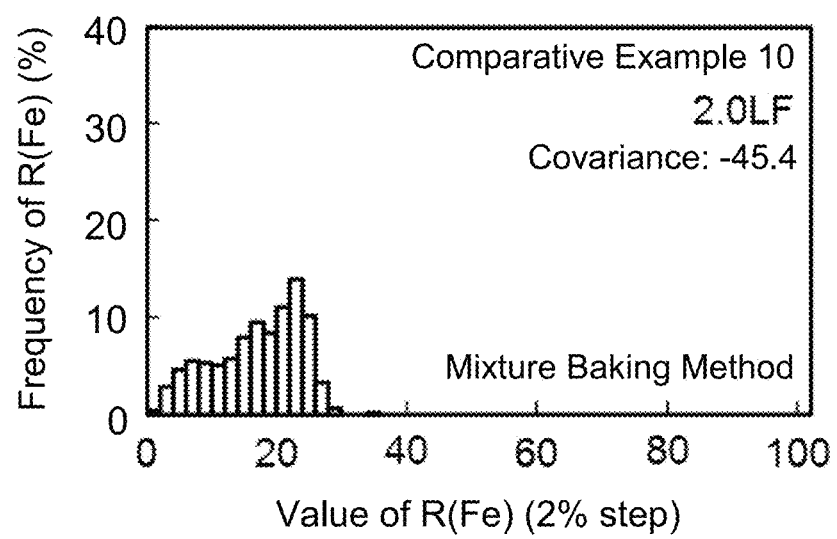
FIG. 25 is a graph showing the frequency distribution of the R (Fe) value of a lanthanum-containing iron oxide obtained in Comparative Example 10.

The mixture was heated to a temperature of 90° C. on a hot stirrer while being agitated with a propeller agitator. Then, the mixture was put into a degreasing furnace that allows circulation of the atmosphere, and was gradually heated in the atmosphere up to a temperature of 250° C. for about 150 hours while being agitated as needed. Then, the mixture was heated in the atmosphere at 250° C. for 8 hours to be condensed. The amount of the resulting concentrate was 58.7 g. After that, pre-baking was performed such that the concentrate was gradually heated in the atmosphere up to a temperature of 300° C. for 10 minutes, and then, the concentrate was heated at 300° C. for 2 hours; then, the concentrate was gradually heated up to a temperature of 400° C. for 10 minutes, and the concentrate was heated at 400° C. for 2 hours; and further, the concentrate was gradually heated up to a temperature of 500° C. for 30 minutes, and the concentrate was heated at 500° C. for 5 hours. The amount of the obtained powder was about 54 g. FIG. 20 shows the temperature history and a change with time of the mass of the concentrate and the pre-baked product during thermal condensation and pre-baking.

After that, at a point in time when the temperature of the degreasing furnace had become less than or equal to 150° C., the pre-baked powder was taken out of the degreasing furnace, and was ground with a mortar down to a size of less than or equal to 100 meshes (150 μm sq.). The thus obtained ground product was put into a crucible with a size of 280 ml, and the crucible was put into a box electric furnace with a lid of the crucible open by about 1/10 to 1/5, so that the ground product was baked in the atmosphere at 900° C. for 5 hours to obtain about 55 g composite oxide powder.

Comparative Example 6

Production of an Iron Oxide-Zirconia Composite Oxide Using a Sol-Gel Method (2)

132.9 g iron(III) acetylacetonate (produced by Wako Pure Chemical Industries, Ltd., reagent), 90.8 g zirconium(IV) acetylacetonate (produced by Wako Pure Chemical Industries, Ltd., reagent), 7.85 g yttrium(III) 2,4-pentanedionate hydrate (produced by Alfa Aesar., reagent), 300 g tetrahydrofuran (produced by Wako Pure Chemical Industries, Ltd., reagent, deoxygenation, and a stabilizer contained), and 1500 g dehydrated ethanol (produced by Wako Pure Chemical Industries, Ltd., reagent) were quickly poured into a glass beaker with a size of 3 L covered with Saran Wrap (registered trademark). Table 1 shows the atomic ratio, the content of $Fe_2O_3$, the content of $ZrO_2$, and the content of $Y_2O_3$ of a composite oxide calculated from such amounts of the prepared materials. The amount of the composite oxide converted from the amounts of the prepared materials was about 55 g.

The mixture was heated to a temperature of 45° C. while being agitated at 200 rpm with a hot stirrer set at 200° C., and further, agitation was continued for 1 hour. After it was confirmed that powder-form materials had dissolved, the lid was removed, and 200 g diethanolamine (produced by Wako Pure Chemical Industries, Ltd., reagent) was added to the obtained solution. Then, the mixture was heated to a temperature of 77° C. while being agitated at 200 rpm with a hot stirrer set at 400° C., and further, heating was continued while the mixture was agitated, so that alcohol was volatilized. At a point in time when about 3 hours had elapsed since the start of the heating at 400° C., the solution was condensed down to about 600 ml, and the temperature of the solution was 86° C.

The solution was moved to a glass beaker with a size of 1 L, and thermal condensation was further continued with a hot stirrer set at 400° C. Then, the temperature of the solution reached 90° C. After that, the set temperature of the hot stirrer was changed to 150° C. to prevent bumping, and the set temperature of the hot stirrer was gradually increased to 250° C. while checking the temperature of the solution so that bumping would not occur, thereby heating the solution up to a temperature of 200° C. At a point in time when about 4 hours had elapsed since the start of the heating at 400° C., the solution was condensed down to about 500 ml.

The obtained solution was cooled down to the room temperature and was left at rest for one night. Then, the solution was put into a degreasing furnace that allows circulation of the atmosphere, and was heated at 250° C. for 5.5 hours and thus condensed down to 275 g. The resulting concentrate was pre-baked in the atmosphere under the conditions of 300° C. for 10 hours→400° C. for 2 hours→500° C. for 5 hours.

After that, at a point in time when the temperature of the degreasing furnace had become less than or equal to 150° C., the pre-baked powder was taken out of the degreasing furnace, and was ground with a mortar down to a size of less than or equal to 100 meshes (150 μm sq.). The thus obtained ground product was put into a crucible with a size of 280 ml, and the crucible was put into a box electric furnace with a lid of the crucible open by about ⅒ to ⅕, so that the ground product was baked in the atmosphere at 900° C. for 5 hours to obtain about 54 g composite oxide powder.

Comparative Example 7

Production of an Iron Oxide-Zirconia Composite Oxide Using a Coprecipitation Method 304.1 g iron(III) nitrate nonahydrate, 102.7 g zirconium nitrate dehydrate, 15.6 g yttrium nitrate, and 245 g distilled water were poured into a glass beaker with a size of 3 L, and were left at rest for one day and night (this mixture will be referred to as "Solution A"). In addition, a 253.6 g ammonia aqueous solution of 25% and 245 g distilled water were poured into a glass beaker with a size of 1 L (this mixture will be referred to as "Solution B"). Table 1 shows the atomic ratio, the content of $Fe_2O_3$, the content of $ZrO_2$, and the content of $Y_2O_3$ of a composite oxide calculated from such amounts of the prepared materials.

Solution B was added to Solution A at once. Then, the two solutions were mixed with a propeller agitator, and were further agitated with a homogenizer at a number of revolutions of 20000 rpm for 5 minutes. The resulting slurry was put into five glass beakers each having a size of 1 L, and the beakers were covered with watch glass. Such beakers were put into a degreasing furnace that allows circulation of the atmosphere, and heating was performed in the atmosphere under the conditions of 150° C. for 3 hours→250° C. for 2 hours→400° C. for 2 hours. Accordingly, the solution was condensed, and further, the resulting concentrate was pre-baked, so that powder was obtained. All portions of the powder were put into a crucible with a size of 280 ml, and were pre-baked at 500° C. for 5 hours.

After that, at a point in time when the temperature of the degreasing furnace had become less than or equal to 150° C., the crucible was taken out of the degreasing furnace, and the power was ground with a mortar down to a size of less than or equal to 100 meshes (150 μm sq.). The thus obtained ground product was put into a crucible with a size of 280 ml, and the crucible was put into a box electric furnace with a lid of the crucible open by about ⅒ to ⅕, so that the ground product was baked in the atmosphere at 900° C. for 5 hours to obtain composite oxide powder.

Comparative Example 8

Production of an Iron Oxide-Zirconia Composite Oxide Using a Powder Mixing Method The yttria-containing zirconia powder obtained in Comparative Example 1 and the iron oxide(III) powder obtained in Comparative Example 4 were mixed so that the atomic ratio of iron, zirconium, and yttrium in the resulting composite oxide satisfies the ratio shown in Table 1. The thus obtained mixture was classified with a sieve of 100 meshes (150 μm sq.). Table 1 shows the atomic ratio, the content of $Fe_2O_3$, the content of $ZrO_2$, and the content of $Y_2O_3$ of a composite oxide calculated from such amounts of the prepared materials.

Comparative Example 9

Production of an Iron Oxide-Zirconia Composite Oxide Using a Sol-Gel Method (3)

A composite oxide was attempted to be prepared in the same way as in Example 1 except that iron(III) nitrate was used instead of ammonium iron(III) citrate. However, when an yttria-containing zirconia sol water suspension in which iron(III) nitrate is dissolved was attempted to be prepared, zirconia and iron were split into different phases. Thus, it was impossible to prepare a homogeneous composite oxide. This is considered to be due to the reason that the dispersiveness of zirconia was lowered by nitrate ions. Further, although a composite oxide was attempted to be prepared by adjusting the pH of the solution or using a zirconia sol containing yttria with different particle sizes, it was still impossible to obtain a homogeneous composite oxide in any case.

<Calculation of the Covariance COV Value>

About 1 g of the obtained composite oxide powder (the yttria-containing zirconia powder in the case of Comparative Example 1 and the iron oxide(III) powder in the case of Comparative Example 4, hereinafter the same) was wrapped in charta, and was then put into a plastic bag. Then, the inside of the plastic bag was vacuum degassed and hermetically sealed, and then, the powder was pressed through isostatic pressing (2 tons/cm$^2$) for 3 minutes. The resulting pressed powder body was crushed and adjusted in particle size to 0.5 to 1 mm sq., and was then heated while being vacuum degassed, so that the crushed composite oxide (a composite oxide pellet) was embedded in an embedding resin for an electron microscope.

A cross-section of the composite oxide pellet embedded in the resin was subjected to mirror polishing (buffing with alumina with a particle size of 0.05 inn), so that carbon was vapor deposited on the cross-section of the polished composite oxide pellet, and silver paste was applied to the cross-section of the resin around the pellet so as to impart conductivity thereto, whereby an analytical sample for an electron probe microanalyzer (EPMA) was produced.

Two grains of the composite oxide pellet in the obtained EPMA analytical sample were selected at random, and an electron probe microanalyzer ("JXA-8200" produced by JEOL Ltd.) was used to perform a ray analysis through EPMA (WDX: wavelength dispersive X-ray spectrometry) under the following conditions:

(Measurement Conditions)
Measured Elements: Fe, Zr, Y
Accelerating Voltage: 15 kV
Sample Current: 50 nA
Beam Diameter: minimum (not greater than 1 μm)
Measurement Range: 1000 μm (500 μm/grain×two grains)
Measurement Intervals: 1 μm
Measurement Points: 1002 points (501 points/grain×two grains)

From the obtained results of the ray analysis, the X-ray intensities corresponding to Fe, Zr, and Y at a measurement point i (where i=1 to n (n=1002)) were determined (the background intensity was corrected), and the ratios of the X-ray intensities of the respective elements to the 100% intensities thereof were calculated ($I_i(Fe)$, $I_i(Zr)$, $I_i(Y)$). It should be noted that when the measurement results were recognized as having abnormal values, the results at the relevant measurement points were not adopted.

Next, $R_i(Fe)$ and $R_i(Zr+Y)$ at the measurement point i were calculated from the following Formulae (1) to (2) for a case where the rare-earth element (X) is yttrium (Y). Further, the mean values $R_{av}(Fe)$ and $R_{av}(Zr+X)$ of $R_i(Fe)$ and $R_i(Zr+Y)$, respectively, at all measurement points n were determined, and the covariance COV(Fe, Zr+Y) was calculated from Formula (3) below. Table 1 shows the results.

[Math. 3]

$$R_i(Fe) = \frac{I_i(Fe) \times 100}{I_i(Fe) + I_i(Zr) + I_i(X)} \quad (1)$$

$$R_i(Zr + X) = \frac{\{I_i(Zr) + I_i(X)\} \times 100}{I_i(Fe) + I_i(Zr) + I_i(X)} \quad (2)$$

$$COV(Fe, Zr + X) = \frac{1}{n}\sum_{i=1}^{n}[\{R_i(Fe) - R_{av}(Fe)\} \times \{R_i(Zr + X) - R_{av}(Zr + X)\}] \quad (3)$$

TABLE 1

| | Atomic Ratio (at %) | | | Content of Oxide (mass %) | | | Method of Preparation | Absolute Value of COV(Fe, Zr + X) |
|---|---|---|---|---|---|---|---|---|
| | Fe | Zr | Y | Fe$_2$O$_3$ | ZrO$_2$ | Y$_2$O$_3$ | | |
| Example 1 | 2.0 | 1.0 | 0.109 | 54.1 | 41.7 | 4.2 | Mixture Baking Method | 6 |
| Example 2 | 0.28 | 1.0 | 0.109 | 14.3 | 77.9 | 7.8 | Mixture Baking Method | Not Measured |
| Example 3 | 0.50 | 1.0 | 0.109 | 22.8 | 70.2 | 7.0 | Mixture Baking Method | 7.3 |
| Example 4 | 1.0 | 1.0 | 0.109 | 37.1 | 57.2 | 5.7 | Mixture Baking Method | 0.6 |
| Example 5 | 3.0 | 1.0 | 0.109 | 63.9 | 32.9 | 3.3 | Mixture Baking Method | 0.5 |
| Example 6 | 5.0 | 1.0 | 0.109 | 74.7 | 23.0 | 2.3 | Mixture Baking Method | 0.8 |
| Example 7 | 9.0 | 1.0 | 0.109 | 84.1 | 14.4 | 1.4 | Mixture Baking Method | 1.3 |
| Comparative Example 1 | 0 | 1.0 | 0.109 | 0.0 | 90.9 | 9.1 | Mixture Baking Method | Not Measured |
| Comparative Example 2 | 0.012 | 1.0 | 0.109 | 0.7 | 90.3 | 9.0 | Mixture Baking Method | Not Measured |
| Comparative Example 3 | 0.13 | 1.0 | 0.109 | 7.1 | 84.4 | 8.4 | Mixture Baking Method | Not Measured |
| Comparative Example 4 | 1.0 | 0 | 0 | 100.0 | 0.0 | 0.0 | Mixture Baking Method | Not Measured |
| Comparative Example 5 | 2.0 | 1.0 | 0.109 | 54.1 | 41.7 | 4.2 | Sol-Gel Method 1 | 723 |
| Comparative Example 6 | 2.0 | 1.0 | 0.109 | 54.1 | 41.7 | 4.2 | Sol-Gel Method 2 | 39 |
| Comparative Example 7 | 2.0 | 1.0 | 0.109 | 54.1 | 41.7 | 4.2 | Coprecipitation Method | 113 |
| Comparative Example 8 | 2.0 | 1.0 | 0.109 | 54.1 | 41.7 | 4.2 | Powder Mixing Method | 2047 |

As is clear from the results shown in Table 1, the absolute value of the covariance COV(Fe, Zr+X) of each of the composite oxide powder produced with the mixture baking method of the present invention (Examples 1 and 3 to 7) was less than or equal to 10, and thus, the uniform dispersibility of Fe and Zr was quite high. Meanwhile, the absolute value of the covariance COV(Fe, Zr+X) of each of the composite oxide powder produced with the sol-gel method (Comparative Examples 5 to 6), the coprecipitation method (Comparative Example 7), and the powder mixing method (Comparative Example 8) was high, and thus, the uniform dispersibility of Fe and Zr was low.

FIGS. 1 to 10 show the frequency distribution of the R (Fe) value of the composite oxide powder obtained in Examples 1 and 3 to 7 and Comparative Examples 5 to 8. As is clear from the results shown in FIGS. 1 to 10, regarding each of the composite oxide powder produced with the mixture baking method of the present invention, the distribution of the R (Fe) value was monodispersed. This shows that such composite oxide includes a number of micro regions with an equal Fe content. Thus, it was confirmed that Fe is uniformly and finely dispersed in the entire composite oxide. Meanwhile, regarding each of the composite oxide powder produced with the sol-gel method (Comparative Examples 5 to 6) and the coprecipitation method (Comparative Example 7), it was found that the distribution of the R (Fe) value is wide, and the Fe content varies from micro region to micro region, and thus, the uniform dispersibility of Fe is lower than that of the iron oxide-zirconia composite oxide of the present invention. Further, in the composite oxide powder produced with the powder mixing method (Comparative Example 8), R (Fe)=0 or R (Fe)=100 at most of the measurement points. This shows that such composite oxide includes a number of micro regions containing only one of Fe or Zr. Thus, the composite oxide powder produced with the powder mixing method was found to have low uniform dispersibility of Fe.

<Heat Resistance Test (1)>

50 g of the obtained composite oxide powder (the yttria-containing zirconia powder in the case of Comparative Example 1 and the iron oxide(III) powder in the case of Comparative Example 4, hereinafter the same), a 43.48 g acetic acid-stabilized alumina sol ("AS200" produced by Nissan Chemical Industries, Ltd., needle-like boehmite hydrated alumina, pH: 4 to 6, and the solid content: 10 to 11 mass % $Al_2O_3$), and 50 g distilled water (it should be noted that the amount of addition of the distilled water was adjusted based on 50 g in accordance with the viscosity of the slurry) were poured into a polyethylene container with a size of 300 ml and with a lid, and were agitated. Further, wet grinding was performed while agitating and mixing the mixture with an attritor for 30 minutes. Distilled water was added to the resulting slurry to adjust the viscosity thereof to an applicable level.

Next, a cordierite honeycomb (produced by NGK INSULATORS, LTD., an externally coated test piece honeycomb, the outer diameter: 30 mm, the length: 50 mm, rectangular cells, 400 cells/inch, the cell thickness: 3 mm) was caused to absorb sufficient distilled water, and then was caused to suction the atmosphere to remove excess moisture. The aforementioned slurry was put on one end surface of the cordierite honeycomb, and the slurry was suctioned from the other end surface, whereby the wall surfaces of the cells were coated with the composite oxide. Then, pre-baking was performed at 250° C. for 5 hours. A composite oxide layer was formed by repeating such coating operations several times so that the amount of the applied composite oxide after the baking became a predetermined amount. Then, baking was performed at 500° C. for 5 hours. After that, the amount of the applied composite oxide after the baking was confirmed, and a heat resistance test was performed by heating the cordierite honeycomb in a box electric furnace, in the atmosphere at 1000° C. for 5 hours.

<Evaluation of the Oxygen Storage Capacity (OSC) (1)>

The oxygen storage capacity (OSC) of the composite oxide after the heat resistance test was measured with a gas analysis test device disclosed in JP 4600715 B. The outer periphery of the cordierite honeycomb having the composite oxide layer was fixed with ceramic fibers, and the cordierite honeycomb was mounted on an Inconel reaction tube. A rich gas (CO (1.6% by volume)+$N_2$ (rest)) or a lean gas ($O_2$ (0.8% by volume)+$N_2$ (rest)), which had been generated with a gas generator (produced by HORIBA STEC, Co., Ltd.) while being heated to 500° C. or 900° C. in a vertical tubular furnace (produced by KYOWA KONETSU KOGYO CO., LTD.), was supplied to the reaction tube at a flow rate of 25 L/minute. The rich gas and the lean gas were alternately switched once every minute using an injector, so as to be supplied to the reaction tube. Five cycles of gas supply were performed (2 minutes/cycle) at each temperature.

Figure 11:
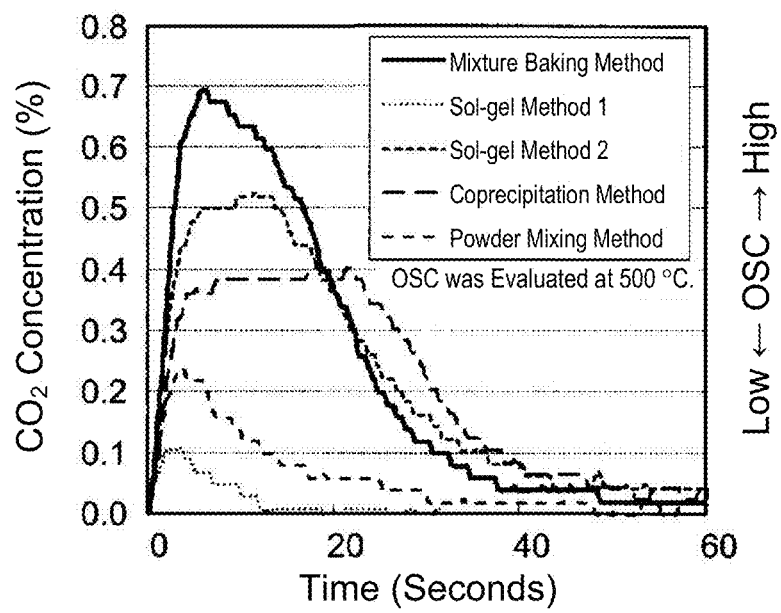
FIG. 11 is a graph showing the results of evaluating the OSC of composite oxides produced with various methods at 500° C.
Figure 12:
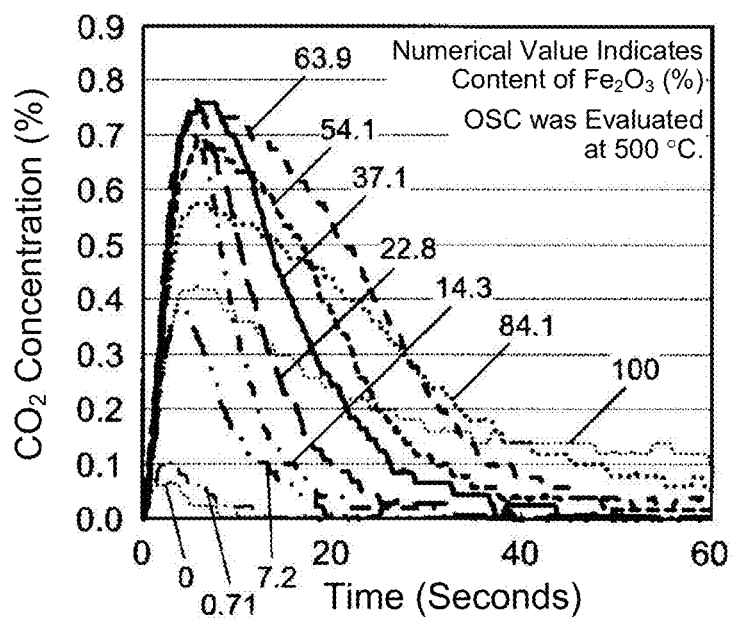
FIG. 12 is a graph showing the results of evaluating the OSC of composite oxides with various contents of $Fe_2O_3$, yttria-containing zirconia, and iron oxide(III) at 500° C.
Figure 13:
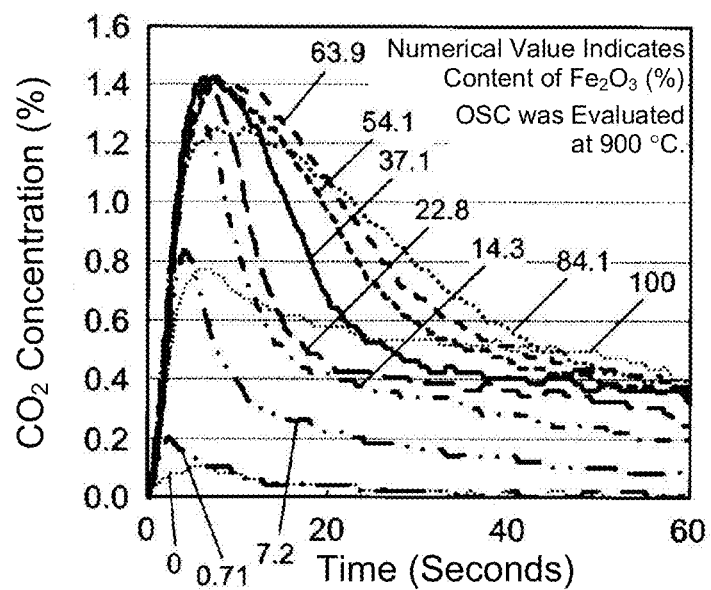
FIG. 13 is a graph showing the results of evaluating the OSC of composite oxides with various contents of $Fe_2O_3$, yttria-containing zirconia, and iron oxide(III) at 900° C.

The concentration of the generated $CO_2$ was measured with an engine exhaust gas measuring apparatus ("MEXA-4300FT" produced by HORIBA, Ltd.). FIG. 11 shows changes with time of the $CO_2$ concentration when OSC evaluation at 500° C. was performed for the composite oxides produced with the various methods in Example 1 and Comparative Examples 5 to 8. FIGS. 12 and 13 show changes with time of the $CO_2$ concentration when OSC evaluations at 500° C. and 900° C. were performed, respectively, on the yttria-containing zirconia powder obtained in Comparative Example 1 and the iron oxide(III) powder obtained in Comparative Example 4. It should be noted that FIGS. 11 to 13 show the results of the fourth or fifth cycle.

Figure 14:
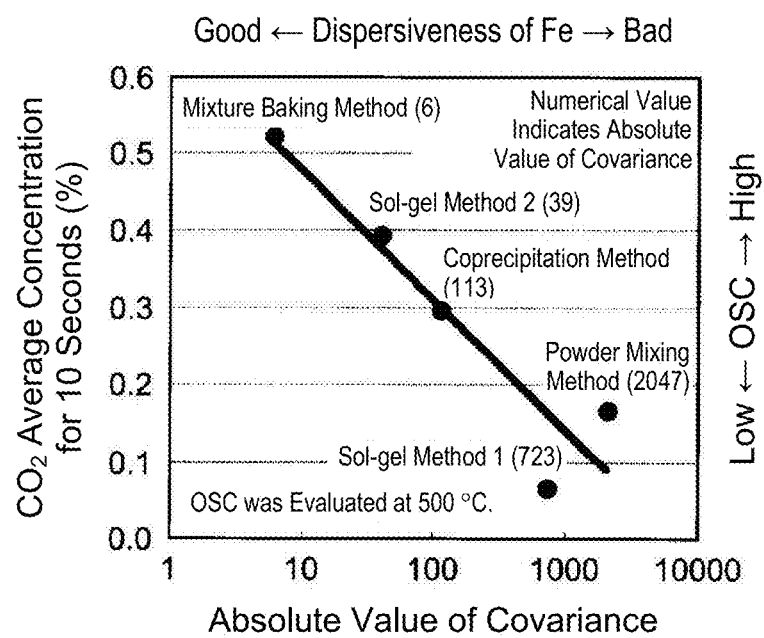
FIG. 14 is a graph showing the relationship between the results of evaluating the OSC at 500° C. (the mean $CO_2$ concentration) and the absolute value of the covariance COV (Fe, Zr+Y).
Figure 15:
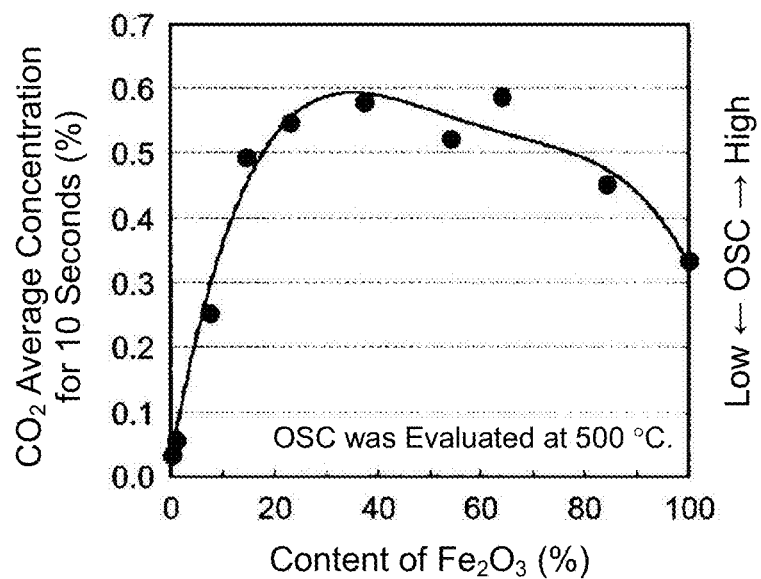
FIG. 15 is a graph showing the relationship between the results of evaluating the OSC at 500° C. (the mean $CO_2$ concentration) and the content of $Fe_2O_3$.
Figure 16:
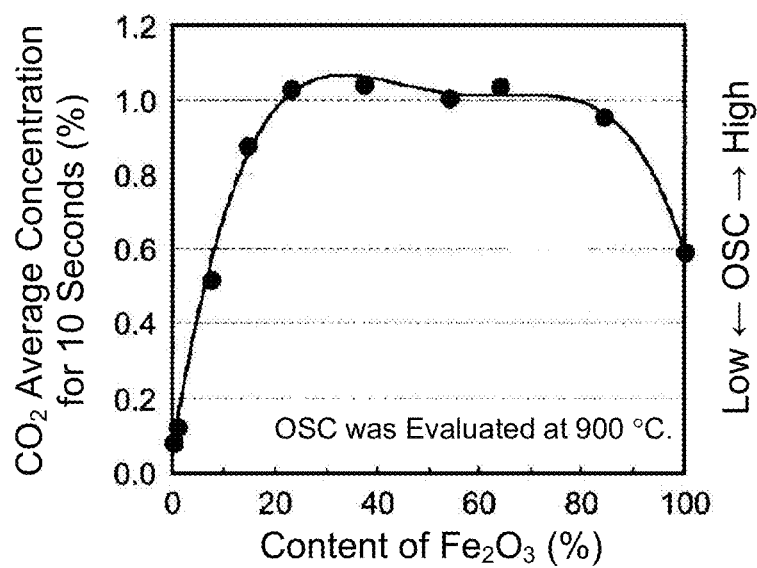
FIG. 16 is a graph showing the relationship between the results of evaluating the OSC at 900° C. (the mean $CO_2$ concentration) and the content of $Fe_2O_3$.

Next, the mean concentration of $CO_2$ that had been generated for 10 seconds since the start of the gas supply was calculated on the basis of the results shown in FIGS. 11 to 13. FIG. 14 shows the relationship between the mean concentration of $CO_2$ calculated on the basis of the results shown in FIG. 11 and the absolute value of the covariance COV(Fe, Zr+Y). FIGS. 15 and 16 show the relationships between the mean concentration of $CO_2$ calculated on the basis of the results shown in FIGS. 12 and 13, respectively, and the concentration of $Fe_2O_3$ in the composite oxide.

As is clear from the results shown in FIG. 14, it was confirmed that the composite oxide powder with a small absolute value of the covariance COV(Fe, Zr+Y), which was produced with the mixture baking method of the present invention (Example 1), has high mean concentration of the generated $CO_2$, and thus has an excellent oxygen storage capacity. Meanwhile, each of the composite oxide powder with a large absolute value of the covariance COV(Fe, Zr+Y), which was produced with the sol-gel method (Comparative Examples 5 to 6), the coprecipitation method (Comparative Example 7), and the powder mixing method (Comparative Example 8), was found to have low mean concentration of the generated $CO_2$ and thus have an inferior oxygen storage capacity.

As is clear from the results shown in FIGS. 15 and 16, it was confirmed that among the composite oxides produced with the mixture baking method, a composite oxide containing 10 to 90 mass % (preferably, 20 to 90 mass %, and more preferably 20 to 70 mass %) $Fe_2O_3$ has high mean concentration of the generated $CO_2$ and thus has an excellent oxygen absorption capacity. Meanwhile, it was found that when the content of $Fe_2O_3$ is less than 10 mass % and over 90 mass %, the mean concentration of the generated $CO_2$ becomes sharply low.

<X-Ray Diffraction Measurement>

Figure 17:
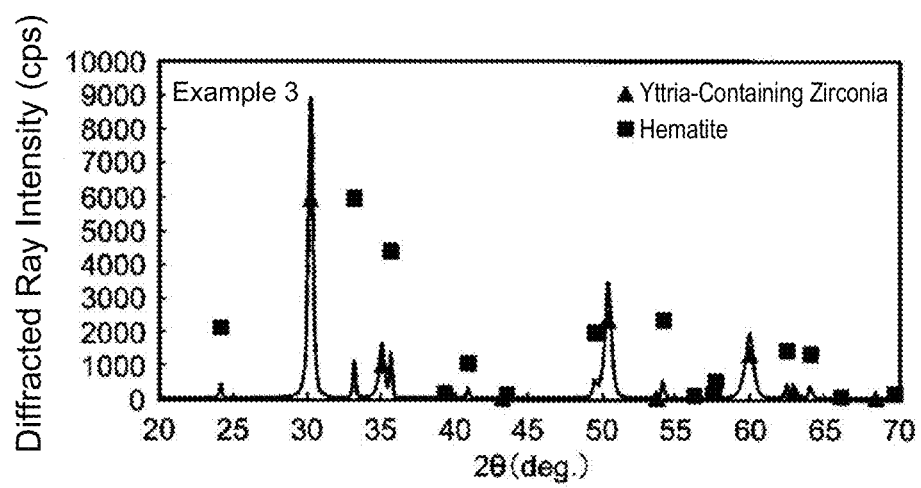
FIG. 17 is a graph showing the XRD spectrum of a composite oxide obtained in Example 3.
Figure 18:
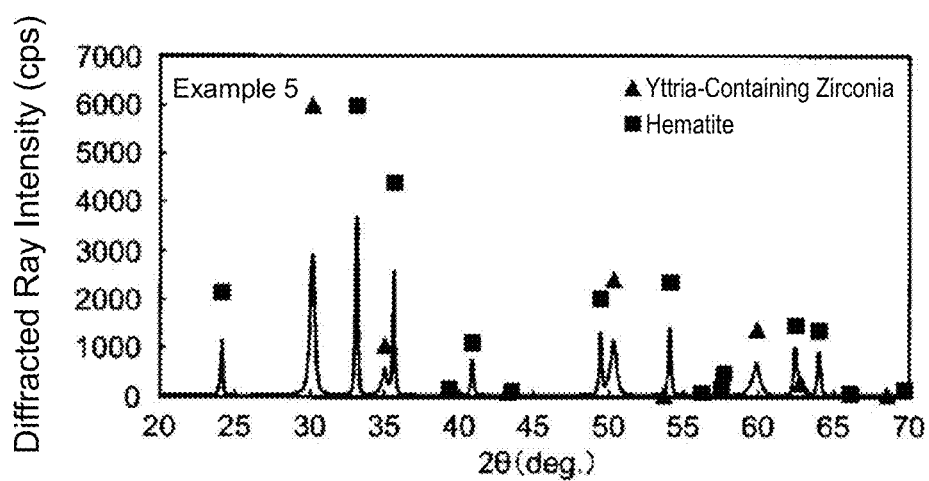
FIG. 18 is a graph showing the XRD spectrum of a composite oxide obtained in Example 5.
Figure 19:
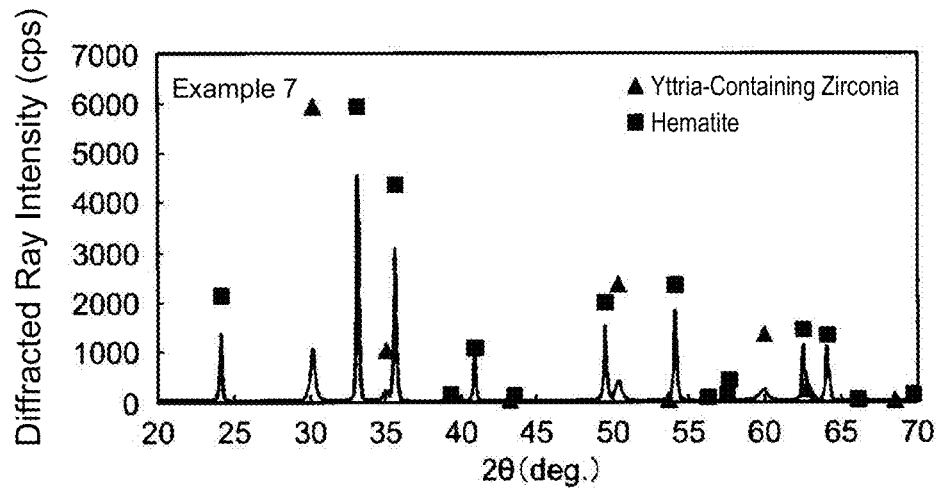
FIG. 19 is a graph showing the XRD spectrum of a composite oxide obtained in Example 7.

The obtained composite oxide powder was ground with an agate mortar, and powder X-ray diffraction (XRD) measurement was performed with a powder X-ray diffraction device ("horizontal-sample-mounting powerful X-ray diffractometer RINT-TTR" produced by Rigaku Corporation) under the conditions of an X-ray source: CuKα ray (λ=0.15418 nm), an accelerating voltage of 50 kV, and an accelerating current of 300 mA. FIGS. 17 to 19 show the XRD spectra of the composite oxides obtained in Examples 3, 5, and 7.

As is clear from the results shown in FIGS. 17 to 19, it was confirmed that all of the iron oxides(III) in the composite oxides produced with the mixture baking method of the present invention are hematite ($\alpha$-$Fe_2O_3$).

Example 8

Production of a Lanthanum-Containing Iron Oxide-Zirconia Composite Oxide Using a Mixture Baking Method First, 277.9 g ammonium iron(III) citrate (produced by Wako Pure Chemical Industries, Ltd., reagent, brown, and the iron content: 16 to 19%), a 378.4 g water-dispersible yttria-containing alkaline zirconia sol ("NanoUse ZR30-BS" produced by Nissan Chemical Industries, Ltd., the sol particle size: 30 to 80 nm, the solid content concentration of $ZrO_2$: 30.8%, and Zr:Y (atomic ratio)=1:0.109), 9 g tetramethylammonium hydroxide (TMAH), and 140 g distilled water were poured into a polyethylene beaker with a size of 1 L to prepare a mixture containing ammonium iron(III) citrate and a zirconia sol. Next, 137.8 g lanthanum oxide fine particles (a reagent produced by KISHIDA CHEMICAL Co., Ltd., the particle size: less than or equal to 15 μm), and 140 g distilled water were mixed to prepare a dispersion liquid of lanthanum oxide fine particles. Table 2 shows the atomic ratio, the content of $Fe_2O_3$, the content of $ZrO_2$, the content of $La_2O_3$, and the content of $Y_2O_3$ of a composite oxide calculated from such amounts of the prepared materials.

After the dispersion liquid of lanthanum oxide fine particles was mixed into the mixture, the mixture was sufficiently agitated with a propeller agitator, and further, 1-minute agitation was performed three times with a homogenizer ("T50 Basic" produced by IKA, with the use of a shaft generator "S50N-G45F" produced by IKA) at a number of revolutions of 6000 to 7000 rpm, whereby a water suspension containing an yttria-containing zirconia sol and lanthanum oxide fine particles, which has ammonium iron(III) citrate dissolved therein, was obtained. The water suspension was collected into a glass beaker with a size of 1 L.

The water suspension was heated from the room temperature using a hot stirrer set at 250° C. while being agitated with a propeller agitator coated with Teflon (registered trademark), whereby the water suspension was condensed. Agitation was stopped before the viscosity of the water suspension increased to such a level that it would become difficult to further agitate the water suspension. Then, the resulting concentrate was put into a dryer at 120° C. together with the propeller blade, and was dried for 12 hours or more. All portions of the obtained powder were put into three crucibles each having a size of 280 ml, and the crucibles were put into a saggar with lids of the crucibles open by about ⅒ to ⅕ so as to completely oxidize the powder. Then, the saggar was put into a degreasing furnace that allows circulation of the atmosphere, and the powder was pre-baked in the atmosphere under the conditions of 150° C. for 3 hours→250° C. for 2 hours→400° C. for 2 hours→500° C. for 5 hours. The total amount of the powder after the pre-baking was about 320 g. After that, at a point in time when the temperature of the degreasing furnace had become less than or equal to 150° C., the saggar was taken out of the degreasing furnace, and all of the powder in the three crucibles were collected into one. Then, the powder was ground with a mortar down to a size of less than or equal to 100 meshes (150 sμm sq.). The thus obtained ground product was put into a crucible with a size of 280 ml, and the crucible was put into a box electric furnace with a lid of the crucible open by about ⅒ to ⅕, so that the ground product was baked in the atmosphere at 1100° C. for 10 hours to obtain about 320 g composite oxide powder (1.0 LFZ).

Examples 9 to 10

Production of a Lanthanum-Containing Iron Oxide-Zirconia Composite Oxide Using a Mixture Baking Method Composite oxide (1.2 LFZ and 2.0 LFZ) powder was obtained in the same way as in Example 8 except that the amounts of lanthanum oxide fine particles, ammonium iron (III) citrate, a water-dispersible yttria-containing alkaline zirconia sol, and distilled water were changed so that the atomic ratio of iron, zirconium, lanthanum, and yttrium satisfied the ratio shown in Table 2. The mixed amount of each material was adjusted so as to obtain 150 to 400 g composite oxide powder. In addition, the agitation time (the number of agitations) of the homogenizer was adjusted in accordance with the amount of the mixture. Table 2 shows the content of $Fe_2O_3$, the content of $ZrO_2$, the content of $La_2O_3$, and the content of $Y_2O_3$ of a composite oxide calculated from such amounts of the prepared materials.

Reference Example 1

Production of a Lanthanum-Containing Iron Oxide-Zirconia Composite Oxide Using a Mixture Baking Method 700 g composite oxide (4.0 LFZ) powder was obtained in the same way as in Example 8 except that the amounts of lanthanum oxide fine particles, ammonium iron(III) citrate, a water-dispersible yttria-containing alkaline zirconia sol, and distilled water were changed so that the atomic ratio of iron, zirconium, lanthanum, and yttrium satisfied the ratio shown in Table 2. Table 2 shows the content of $Fe_2O_3$, the content of $ZrO_2$, the content of $La_2O_3$, and the content of $Y_2O_3$ of a composite oxide calculated from such amounts of the prepared materials.

Comparative Example 10

Production of a Lanthanum-Containing Iron Oxide Using a Mixture Baking Method 400 g lanthanum-containing iron oxide (2.0 LF) powder was obtained in the same way as in Example 10 except that a water-dispersible yttria-containing alkaline zirconia sol was not used. Table 2 shows the atomic ratio, the content of $Fe_2O_3$ and the content of $La_2O_3$ of a composite oxide calculated from such amounts of the prepared materials.

<Calculation of the Covariance COV Value>

An EPMA-based ray analysis was performed on the obtained lanthanum-containing composite oxide (LFZ) powder (the lanthanum-containing iron oxide (LF) powder in the case of Comparative Example 10, hereinafter the same) in accordance with the method described in the <Calculation of the covariance COV value> above except that Fe, Zr, La, and Y were measured, and lanthanum (La)+yttrium (Y) were used as the rare-earth element (X), and the covariance COV(Fe, Zr+La+Y) was calculated. Table 2 shows the results thereof.

Figure 29:
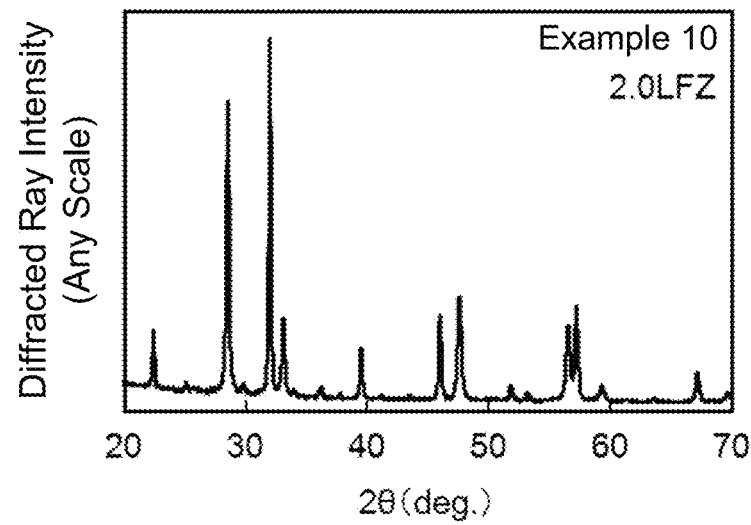
FIG. 29 is a graph showing an X-ray diffraction pattern of the lanthanum-containing composite oxide obtained in Example 10.
Figure 30:
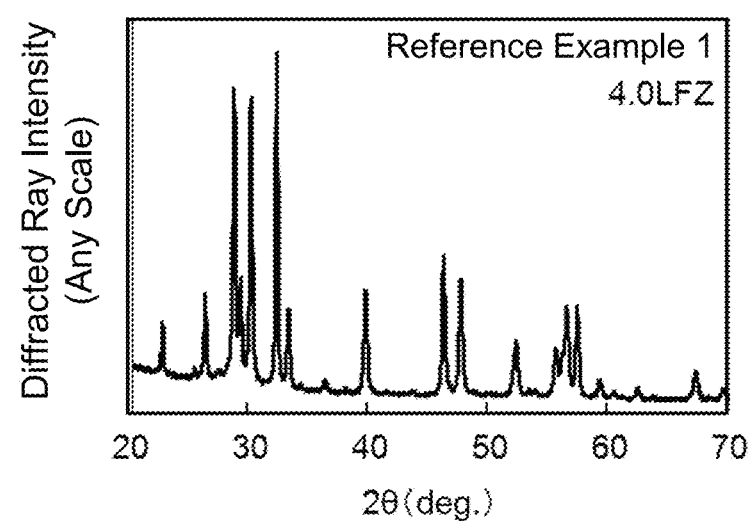
FIG. 30 is a graph showing an X-ray diffraction pattern of the lanthanum-containing composite oxide obtained in Reference Example 1.

FIGS. 29 to 30 are graphs showing the XRD spectra of the lanthanum-containing composite oxide (LFZ) obtained in Example 10 and Reference Example 1.

TABLE 2

| | Atomic Ratio (at %) | | | | Content of Oxide (mass %) | | | | Method of Preparation | Absolute Value of COV(Fe, Zr + La + Y) |
|---|---|---|---|---|---|---|---|---|---|---|
| | Fe | Zr | La | Y | $Fe_2O_3$ | $ZrO_2$ | $La_2O_3$ | $Y_2O_3$ | | |
| Example 8 | 1.0 | 1.0 | 1.0 | 0.109 | 21.1 | 32.6 | 43.1 | 3.3 | Mixture Baking Method | 8.2 |
| Example 9 | 1.0 | 1.0 | 1.2 | 0.109 | 19.4 | 30.0 | 47.6 | 3.0 | Mixture Baking Method | 1.9 |
| Example 10 | 1.0 | 1.0 | 2.0 | 0.109 | 14.8 | 22.8 | 60.2 | 2.3 | Mixture Baking Method | 0.9 |
| Reference Example 1 | 1.0 | 1.0 | 4.0 | 0.109 | 9.2 | 14.2 | 75.2 | 1.4 | Mixture Baking Method | 0.2 |
| Comparative Example 10 | 1.0 | 0 | 2.0 | 0 | 19.7 | 0 | 80.3 | 0 | Powder Mixing Method | 45.4 |

As is clear from the results shown in Table 2, the absolute value of the covariance COV(Fe, Zr+La+Y) of each of the lanthanum-containing composite oxide (LFZ) powder produced with the mixture baking method (Examples 8 to 10 and Reference Example 1) was less than or equal to 10, and thus, the uniform dispersibility of Fe and Zr+La+Y was quite high. However, the content of $Fe_2O_3$ of the 4.0 LFZ powder obtained in Reference Example 1 was small. Meanwhile, the absolute value of the covariance COV(Fe, Zr+La+Y) of the lanthanum-containing iron oxide (LF) powder produced with the mixture baking method (Comparative Example 10) was high, and thus, that the uniform dispersibility of Fe and La was low.

FIGS. 21 to 25 show the frequency distribution of the R (Fe) value of the lanthanum-containing composite oxide (LFZ) powder obtained in Examples 8 to 10 and Reference 1 and the lanthanum-containing iron oxide (LF) powder obtained in Comparative Example 10. As is clear from the results shown in FIGS. 21 to 25, regarding each of the lanthanum-containing composite oxide (LFZ) powder produced with the mixture baking method, the distribution of the R (Fe) value was monodispersed. This shows that such lanthanum-containing composite oxide (LFZ) includes a number of micro regions with an equal Fe content. Thus, it was confirmed that Fe is uniformly and finely dispersed in the entire composite oxide. Meanwhile, regarding the lanthanum-containing iron oxide (LF) powder produced with the mixture baking method, it was found that the distribution of the R (Fe) value is wide, and the Fe content varies from micro region to micro region, and thus, the uniform dispersibility of Fe is lower than that of the lanthanum-containing iron oxide-zirconia composite oxide of the present invention.

<Energy Dispersive X-Ray Analysis and X-Ray Diffraction Measurement>

Figure 26:
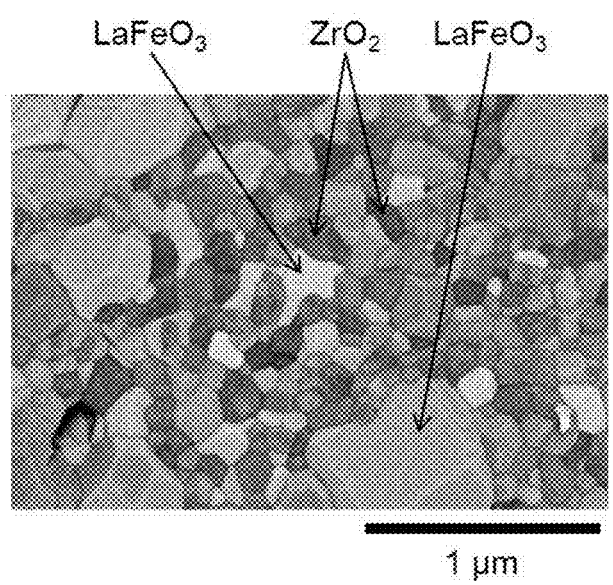
FIG. 26 is a photograph of a reflected electron image obtained with a scanning electron microscope that indicates the results of an energy dispersive X-ray analysis of the lanthanum-containing composite oxide obtained in Example 8, and a compound of each part estimated from an XRD spectrum (primary particles).
Figure 27:
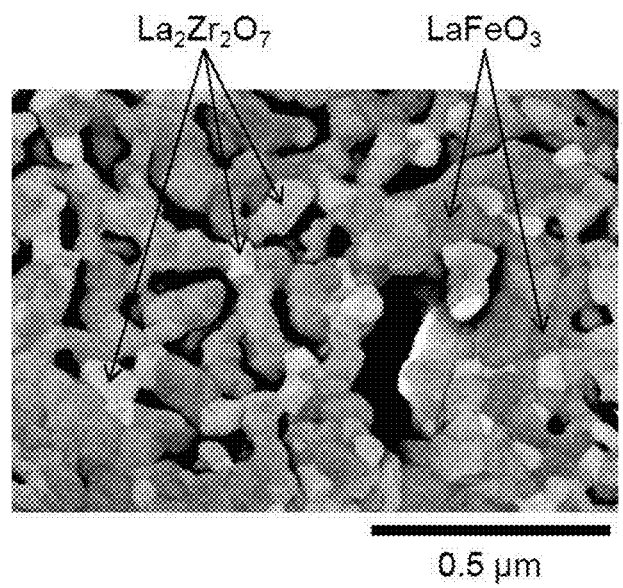
FIG. 27 is a photograph obtained with a scanning electron microscope that indicates a compound of each part (primary particles) of the lanthanum-containing composite oxide obtained in Example 10.
Figure 28:
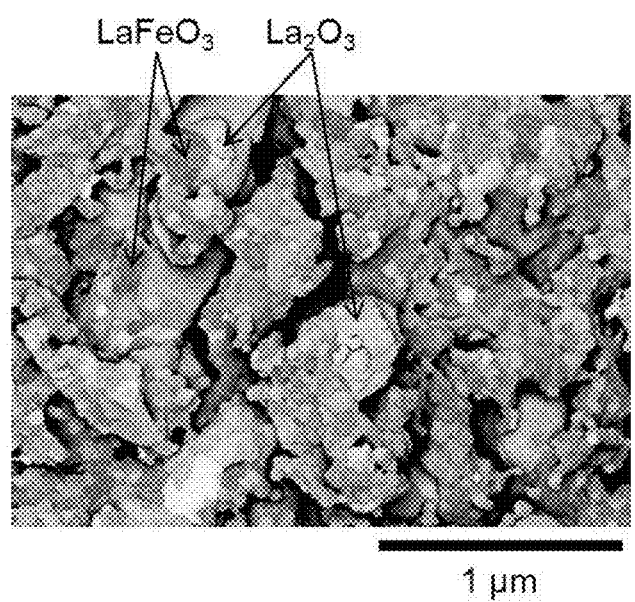
FIG. 28 is a photograph obtained with a scanning electron microscope that indicates a compound of each part (primary particles) of the lanthanum-containing composite oxide obtained in Reference Example 1.

An energy dispersive X-ray analysis (EDX analysis) of the obtained lanthanum-containing composite oxide (LFZ) powder was performed using a scanning electron microscope with an energy dispersive X-ray analysis device ("S-5500" produced by Hitachi High-Technologies Corporation). FIGS. 26 to 28 are SEM photographs showing the EDX analysis results of the lanthanum-containing composite oxide (LFZ) powder obtained in Examples 8 and 10 and Reference Example 1.

The obtained lanthanum-containing composite oxide (LFZ) powder was ground with an agate mortar, and then, powder X-ray diffraction (XRD) measurement was performed in accordance with the method described in the <X-ray diffraction measurement> above. FIGS. 29 to 30 show examples of the results thereof. It should be noted that From the obtained EDX analysis results and XRD measurement results, it was confirmed that $LaFeO_3$ and $ZrO_2$ were generated from the lanthanum-containing composite oxide (1.0 LFZ) obtained in Example 8. It was also confirmed that $LaFeO_3$ and $La_2Zr_2O_7$ were generated from the lanthanum-containing composite oxide (2.0 LFZ) obtained in Example 10, but $La_2O_3$, $Fe_2O_3$, or $ZrO_2$ was not contained in the oxide. Further, no other impurities were detected. Meanwhile, it was confirmed that $LaFeO_3$, $La_2Zr_2O_7$, and $La_2O_3$ were generated from the lanthanum-containing composite oxide (4.0 LFZ) obtained in Reference Example 1. Further, no other impurities were detected.

<Measurement of Particle Size>

The primary particle size of each oxide particle that forms the obtained lanthanum-containing composite oxide (LFZ) powder was observed on the basis of the SEM observation results and the XRD measurement results. Table 3 shows the primary particle sizes of oxide fine particles that form the lanthanum-containing composite oxide (LFZ) powder obtained in Examples 8 and 10 and Reference Example 1 and the lanthanum-containing iron oxide (LF) powder obtained in Comparative Example 10.

TABLE 3

| | Composite Oxide | Pprimary Particle Size (µm) | | | |
|---|---|---|---|---|---|
| | | $LaFeO_3$ | $ZrO_2$ (tetragonal) | $La_2Zr_3O_7$ | $La_2O_3$ |
| Example 8 | 1.0 LFZ | 0.3 to 0.8 | 0.1 to 0.2 | — | — |
| Example 10 | 2.0 LFZ | 0.1 to 0.2 | — | 0.05 to 0.1 | — |
| Reference Example 1 | 4.0 LFZ | 0.1 to 0.2 | — | 0.05 to 0.1 | 0.3 to 0.5 |
| Comparative Example 10 | 2 LFZ | 0.2 to 0.4 | — | — | 1 to 2 |

As is clear from the results shown in Table 3, as the content of La is higher, the primary particle size of $LaFeO_3$ tends to become smaller, and $La_2Zr_2O_7$ with a smaller primary particle size than $ZrO_2$ tends to be generated. Thus, it was found that adding La will decrease the particle size of primary particles that form an iron oxide-zirconia composite oxide.

Example 11

Preparation of Catalyst 7.57 g lanthanum-containing composite oxide (2.0 LFZ) powder (Fe:Zr:La:Y (atomic ratio)=1.0:1.0:2.0:0.109)

obtained in Example 10, a 13.02 g rhodium catalyst supported on a ceria-zirconia containing support (the amount of Rh supported: 0.02 g), 5 g lanthanum-stabilized alumina powder, a 26.43 g acetic acid-stabilized alumina sol ("AS200" produced by Nissan Chemical Industries, Ltd., needle-like boehmite hydrated alumina, pH: 4 to 6, and the solid content: 10 to 11 mass % $Al_2O_3$), and 18.87 g distilled water were poured into a polyethylene container with a size of 300 ml and with a lid, and then were agitated and mixed. Then, the resulting slurry was evaporated and dried to prepare a slurry pellet (solid).

Next, the slurry pellet (solid) was put into a degreasing furnace, and was pre-baked at 150° C. for 2 hours, and then baked at 500° C. for 3 hours. The thus obtained pellet was adjusted in particle size to 0.5 to 1 mm, and was further baked at 900° C. for 5 hours, whereby a pallet catalyst containing a lanthanum-containing composite oxide (2.0 LFZ) was obtained.

Example 12

A pellet catalyst containing a lanthanum-containing composite oxide (1.0 LFZ) was prepared in the same way as in Example 11 except that 5.29 g lanthanum-containing composite oxide (1.0 LFZ) powder (Fe:Zr:La:Y (atomic ratio)=1.0:1.0:1.0:0.109) obtained in Example 8 was used instead of the 7.57 g lanthanum-containing composite oxide (2.0 LFZ) powder.

Example 13

A pellet catalyst containing a lanthanum-containing composite oxide (1.2 LFZ) was prepared in the same way as in Example 11 except that 5.75 g lanthanum-containing composite oxide (1.2 LFZ) powder (Fe:Zr:La:Y (atomic ratio)=1.0:1.0:2.0:0.109) obtained in Example 9 was used instead of the 7.57 g lanthanum-containing composite oxide (2.0 LFZ) powder.

Reference Example 2

A pellet catalyst containing a lanthanum-containing composite oxide (4.0 LFZ) was prepared in the same way as in Example 11 except that 12.13 g lanthanum-containing composite oxide (4.0 LFZ) powder (Fe:Zr:La:Y (atomic ratio)=1.0:1.0:4.0:0.109) obtained in Reference Example 1 was used instead of the 7.57 g lanthanum-containing composite oxide (2.0 LFZ) powder.

Reference Example 3

A pellet catalyst containing a composite oxide (FZ) not containing lanthanum was prepared in the same way as in Example 11 except that 2.06 g composite oxide (FZ) powder not containing lanthanum obtained in Example 1 was used instead of the 7.57 g lanthanum-containing composite oxide (2.0 LFZ) powder.

Comparative Example 11

A pellet catalyst containing a lanthanum-containing composite oxide (2.0 LF) was prepared in the same way as in Example 11 except that 5.68 g lanthanum-containing iron oxide (2.0 LF) powder obtained in Comparative Example 10 was used instead of the 7.57 g lanthanum-containing composite oxide (2.0 LFZ) powder.

Comparative Example 12

A pellet catalyst was prepared in the same way as in Example 11 except that lanthanum-containing composite oxide (2.0 LFZ) powder was not used.

<Heat Resistance Test (2)>

A quartz reaction tube was filled with each of the pellet catalysts obtained in Examples 11 to 13, Reference Examples 2 to 3, and Comparative Examples 11 to 12 such that the content of the rhodium catalyst and the content of the alumina catalyst become equal, and a heat resistance test was performed in the rich/lean atmospheres under the conditions that the total amount of gas circulated through the pellet catalyst. That is, a rich gas (CO (5% by volume)+$N_2$ (rest)) or a lean gas ($O_2$ (5% by volume)+$N_2$ (rest)), which had been generated with a gas generator while being heated to 1050° C. in a horizontal tubular furnace (produced by KYOWA KONETSU KOGYO CO., LTD.), was supplied to the quartz reaction tube filled with each pellet catalyst at a flow rate of 0.5 L/minute, and a heat resistance test in the rich/lean atmospheres was performed for 5 hours. The rich gas and the lean gas were alternately switched once every ten minutes using a solenoid valve, so as to be supplied to the reaction tube.

<Evaluation of the Oxygen Storage Capacity (OSC) (2)>

Next, a rich gas (CO (1.6% by volume)+$N_2$ (rest)) or a lean gas ($O_2$ (0.8% by volume)+$N_2$ (rest)), which had been generated with a gas generator while being heated at a constant temperature of 900° C. in a vertical tubular furnace disclosed in JP 4600715 B, was supplied to the reaction tube containing the slurry pellet catalyst after the heat resistance test, as in the aforementioned method. The concentration of $CO_2$ generated at this time was measured with an engine exhaust gas measuring apparatus ("MEXA-4300FT" produced by HORIBA, Ltd.).

Figure 31:
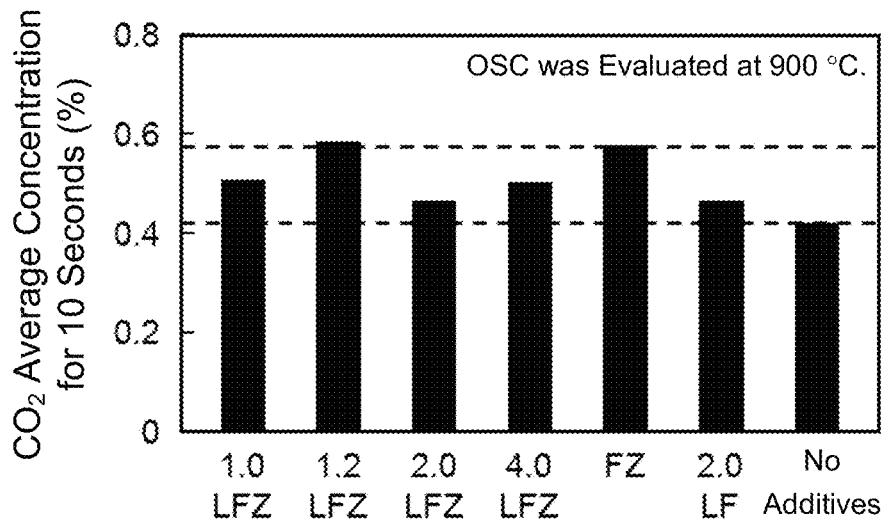
FIG. 31 is a graph showing the oxygen storage capacity of a catalyst containing each composite oxide after a heat resistance test in the rich/lean atmospheres.

Next, the mean concentration of $CO_2$ that had been generated for 10 seconds since the start of the gas supply of the fourth or fifth cycle was calculated on the basis of a change with time of the obtained $CO_2$ concentration. FIG. 31 shows the mean concentration of $CO_2$ of a catalyst containing each composite oxide and a catalyst not containing a composite oxide. As is clear from the results shown in FIG. 31, it was confirmed that a catalyst containing a lanthanum-containing composite oxide (LFZ) (Examples 11 to 13 and Reference Example 2) has a higher oxygen storage capacity after a heat resistance test in the rich/lean atmospheres than a catalyst not containing a composite oxide (FZ) or a lanthanum-containing composite oxide (LFZ) (Comparative Example 12). It was also confirmed that a catalyst containing a lanthanum-containing composite oxide (1.2 LFZ) with a La/Fe atomic ratio of 1.2 (Example 13) has a higher oxygen storage capacity after a heat resistance test in the rich/lean atmospheres than a catalyst containing a composite oxide (FZ) not containing lanthanum (Reference Example 3), and thus has excellent heat resistance.

<Evaluation of the Catalyst Performance>

Figure 32:
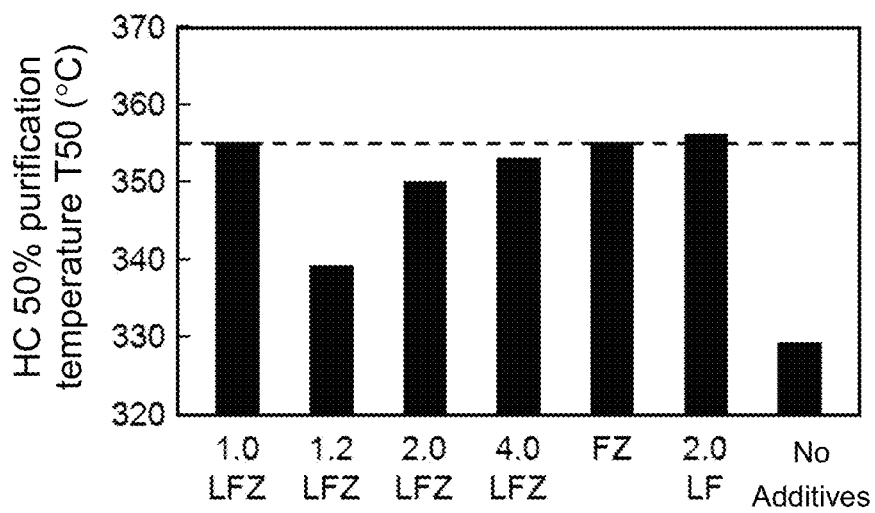
FIG. 32 is a graph showing the catalyst performance of a catalyst containing each composite oxide after a heat resistance test in the rich/lean atmospheres.
Figure 33:
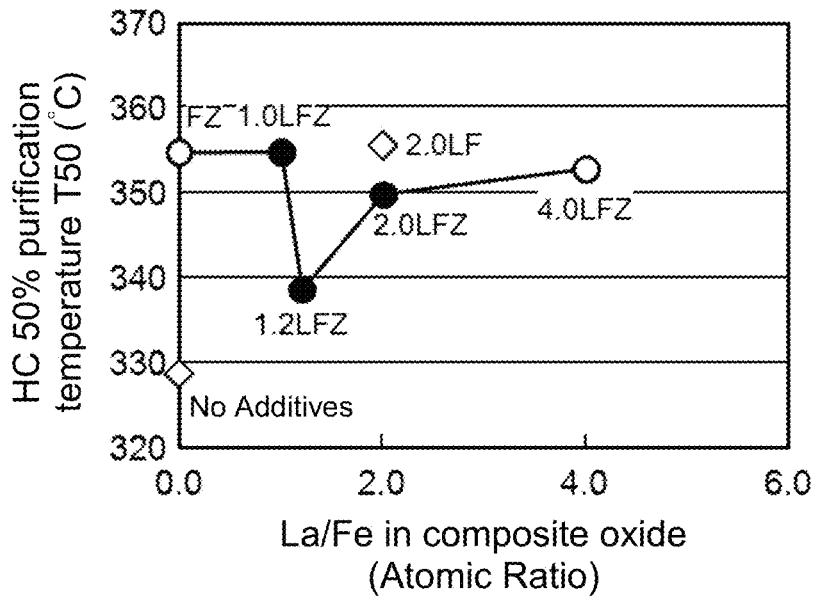
FIG. 33 is a graph showing the relationship between the atomic ratio of lanthanum to iron in a composite oxide and the catalyst performance of a catalyst containing the composite oxide after a heat resistance test in the rich/lean atmospheres.

A model gas containing CO (1000 ppm), $C_3H_6$ (1000 ppmC), $O_2$ (0.4% by volume), $CO_2$ (10% by volume), $H_2O$ (10% by volume), and $N_2$ (rest) was supplied to the reaction tube containing the catalyst after the heat resistance test (2), at a gas flow rate of 25 L/min to make the gas into contact with the catalyst. During the gas supply, the temperature of the gas, which is to be made into contact with the catalyst (the gas supplied to the catalyst), was increased at a temperature increase rate of 24° C./min from 150° C. (the initial temperature) to 700° C. Then, the concentration of $C_3H_6$ contained in the gas that has contacted the catalyst (the gas released from the catalyst) was measured, and the temperature at which the purification rate of $C_3H_6$ reaches 50% (the HC 50% purification temperature T50) was determined on the basis of the measured value (the concentration of $C_3H_6$ in the gas released from the catalyst) and the concentration of $C_3H_6$ in the gas supplied to the catalyst. FIG. 32 shows the HC 50% purification temperature T50 of a catalyst containing each composite oxide and a catalyst not containing a composite oxide. In addition, FIG. 33 shows the relationship between the atomic ratio (La/Fe) of lanthanum to iron in each composite oxide and the HC 50% purification temperature T50.

As is clear from the results shown in FIG. 32, it was confirmed that a catalyst containing a lanthanum-containing composite oxide (LFZ) (Examples 11 to 13 and Reference Example 2) has a lower HC 50% purification temperature after a heat resistance test in the rich/lean atmospheres than a catalyst containing a composite oxide (FZ) not containing lanthanum (Reference Example 3), and thus has excellent heat resistance. In particular, as is clear from the results shown in FIG. 33, a catalyst containing a lanthanum-containing composite oxide (1.2 LFZ) with a La/Fe atomic ratio of 1.2 (Example 13) was found to have the lowest HC 50% purification temperature, and thus have the most excellent heat resistance.

Example 14

2.0 g composite oxide (FZ) powder not containing lanthanum obtained in Example 1, a 10 g palladium catalyst supported on a lanthanum-stabilized alumina support (the amount of Pd supported: 0.1 g), 15 g distilled water, and a 1.2 g alumina sol were poured into a polyethylene container with a size of 300 ml and with a lid, and were then agitated and mixed. The resulting slurry was evaporated and dried to prepare a paste. A pellet catalyst containing a composite oxide (FZ) not containing lanthanum was prepared in the same way as in Example 11 except that such a paste was used.

Comparative Example 13

Manganese-containing iron oxide-zirconia composite oxide (FMZ) powder was obtained in the same way as in Example 1 except that manganese(II) acetate tetrahydrate and ammonia water were further added. The atomic ratio of the composite oxide calculated from such amounts of the prepared materials was Fe:Mn:Zr:Y=0.5:0.25:1:0.109.

A pellet catalyst containing a manganese-containing composite oxide (FMZ) was prepared in the same way as in Example 14 except that 5.23 g manganese-containing composite oxide (FMZ) powder was used instead of the composite oxide (FZ) powder not containing lanthanum, and the amount of the alumina sol was changed to 1.52 g.

<Evaluation of the Oxygen Storage Capacity (OSC) (3)>

Figure 34:
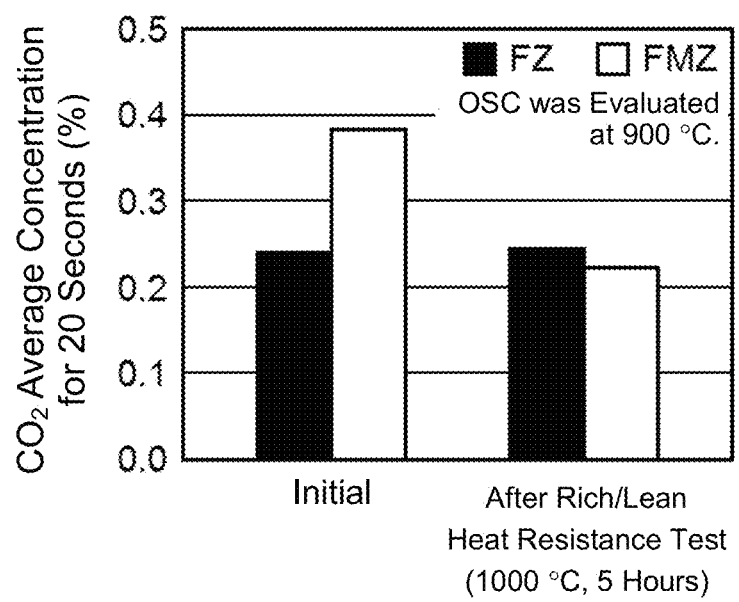
FIG. 34 is a graph showing the catalyst performance of a catalyst containing the composite oxide obtained in Example 1 and the catalyst performance of a catalyst containing a manganese-containing composite oxide obtained in Comparative Example 11 before and after a heat resistance test in the rich/lean atmospheres.

An evaluation test of the oxygen storage capacity of each pellet catalyst was performed as in the method described in <Evaluation of the oxygen storage capacity (OSC) (2)> above except that heat resistance tests were not performed on the pellet catalyst containing a composite oxide (FZ) not containing lanthanum obtained in Example 14 and the pellet catalyst containing a manganese-containing composite oxide (FMZ) obtained in Comparative Example 13. In addition, a heat resistance test in the rich/lean atmospheres was performed as in the method described in <Heat resistance test (2)> above except that the heating temperature was changed to 1000° C. Then, an evaluation test of the oxygen storage capacity of each catalyst after the heat resistance test was performed as in the method descried in <Evaluation of the oxygen storage capacity (OSC) (2)> above. FIG. 34 shows the results thereof.

As is clear from the results shown in FIG. 34, regarding the catalyst containing a composite oxide (FZ) not containing lanthanum (Example 14), no decrease in the oxygen storage capacity was found before and after the heat resistance test in the rich/lean atmospheres. Meanwhile, regarding the catalyst containing a manganese-containing composite oxide (FMZ) (Comparative Example 13), it was found that the oxygen storage capacity after a heat resistance test in the rich/lean atmospheres significantly decreases as compared to that before the heat resistance test. That is, it was confirmed that the iron oxide-zirconia composite oxide of the present invention has excellent heat resistance as compared to that of a manganese-containing iron oxide-zirconia composite oxide.

Examples of an Exhaust Gas Purification Catalyst

Embodiments 1 and 2

Next, Embodiments 1 and 2 of the exhaust gas purification catalyst of the present invention will be described.

Figure 35:
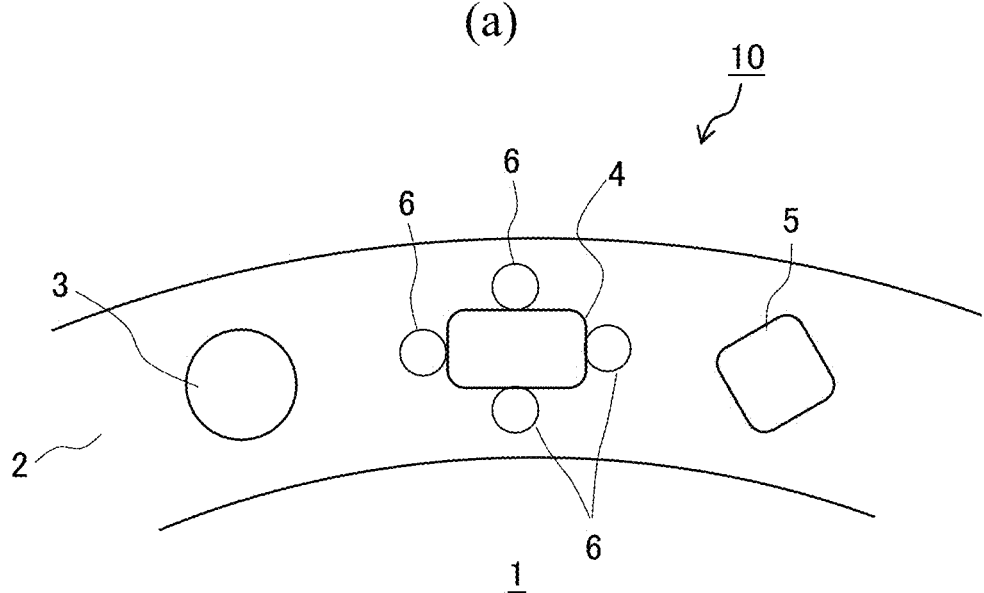
FIGS. 35(a) and 35(b) are partially enlarged schematic diagrams of Embodiments 1 and 2 of the exhaust gas purification catalyst of the present invention.
Figure 35:
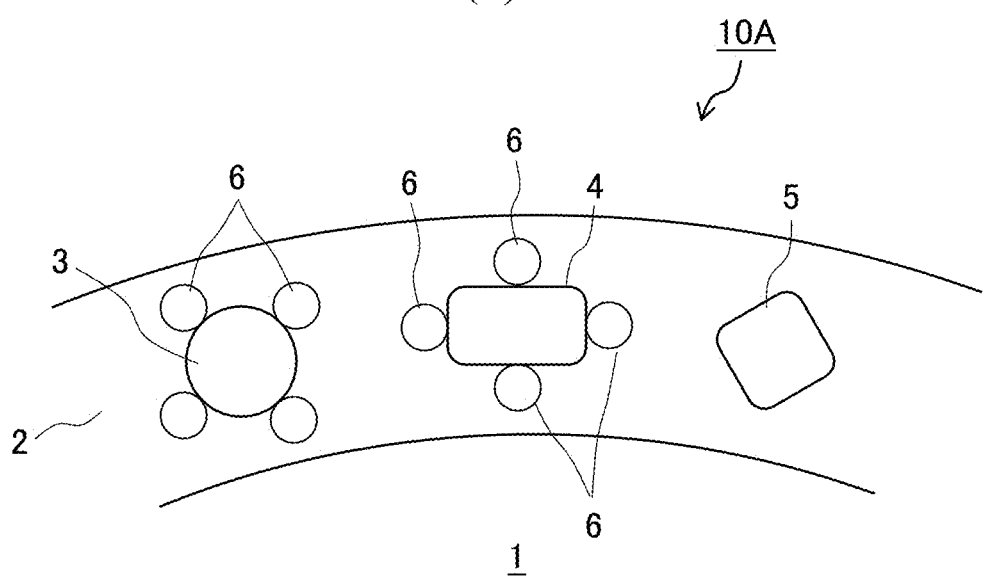

Each of FIGS. 35a and 35b is a partially enlarged schematic diagram of an embodiment of the exhaust gas purification catalyst of the present invention.

An exhaust gas purification catalyst 10 shown in FIG. 35a (Embodiment 1) includes, for example, a support 1 made of ceramic cells with a honeycomb structure, and a catalyst layer 2 formed on the surface of the support 1. The catalyst layer 2 includes an aluminum oxide 3, a cerium oxide-zirconia composite oxide 4, and an iron oxide-zirconia composite oxide 5. A noble metal catalyst 6 containing Pd or Pt is supported on the cerium oxide-zirconia composite oxide 4. It should be noted that the exhaust gas purification catalyst 10 may also be an exhaust gas purification catalyst with a catalyst layer in which the noble metal catalyst 6 containing Pd or Pt is supported on the aluminum oxide 3.

Examples of the cerium oxide-zirconia composite oxide 4, which is promoter, include not only a $CeO_2$—$ZrO_2$ compound, which is a so-called CZ material, but also a so-called ACZ material (an $Al_2O_3$—$CeO_2$—$ZrO_2$ ternary composite oxide) in which $Al_2O_3$ is introduced as a diffusion barrier.

Meanwhile, examples of the iron oxide-zirconia composite oxide 5 include a $Fe_2O_3$—$ZrO_2$ composite oxide and a $Fe_2O_3$—$ZrO_2$—$Y_2O_3$ composite oxide.

Since the catalyst layer 2, which is a single coat layer, includes not only $Al_2O_3$ and the cerium oxide-zirconia composite oxide 4 but also the iron oxide-zirconia composite oxide 5 as promoters, it is possible to ensure high OSC performance in the high-temperature range. Further, since Fe serves as an active site, it is not necessary to increase the amount of the noble catalyst to maintain the OSC performance, and further, since a single catalyst layer contains both the iron oxide-zirconia composite oxide and the cerium oxide-zirconia composite oxide, it is possible to obtain higher OSC performance than the sum of the OSC performance of when the catalyst layer contains one of the two composite oxides alone and the OSC performance of when the catalyst layer contains the other of the two composite oxides alone. Thus, synergistic effects obtained by the coexistence of the two composite oxides are expected.

Meanwhile, although an exhaust gas purification catalyst 10A shown in FIG. 35b (Embodiment 2) has the same basic structure as the exhaust gas purification catalyst 10, the noble metal catalyst 6 is supported not only on the cerium oxide-zirconia composite oxide 4 but also on the aluminum oxide 3.

It has been demonstrated that in comparison with the exhaust gas purification catalyst 10 in which the noble metal catalyst 6 is supported only on the cerium oxide-zirconia composite oxide 4, the exhaust gas purification catalyst 10A in which the noble metal catalyst 6 is supported on both the cerium oxide-zirconia composite oxide 4 and the aluminum oxide 3 has significantly higher OSC performance after the endurance. Thus, defining the promoters for supporting the noble metal catalyst will ensure excellent OSC performance of the exhaust gas purification catalyst after the endurance.

A preferred embodiment of the iron oxide-zirconia composite oxide for forming the exhaust gas purification catalyst 10 or 10A of the present invention is a composite oxide containing iron, zirconium, and a rare-earth element as described above. The total content of $Fe_2O_3$, $ZrO_2$, and an oxide of the rare-earth element is not less than 90 mass %, the content of an iron oxide in terms of $Fe_2O_3$ is 10 to 90 mass %, and the absolute value of the covariance COV(Fe, Zr+X) of the composite oxide, which has been baked in the atmosphere at 900° C. for 5 hours, determined by the three formulae of [Math. 3] above, is not greater than 20.

[Experiments of Verifying the OSC Performance in the Low-Load Region to the High-Load Region, Experiments of Verifying the OSC Performance after the Endurance, and Results Thereof]

The inventors produced exhaust gas purification catalysts with the structures shown in FIGS. 35a and 35b (Examples 15 and 16), an exhaust gas purification catalyst having a catalyst layer without a FZ material (Comparative Example 14), and an exhaust gas purification catalyst having a catalyst layer without a CZ material (Comparative Example 15), and performed experiments of verifying changes in the OSC performance in the low-load region to the high-load region using Example 15 and Comparative Example 14. The inventors also performed experiments of verifying the OSC performance after the endurance using Examples 15 and 16 and Comparative Examples 14 and 15.

First, regarding the composite oxide used, $Al_2O_3$—$La_2O_3$ (the contents of the respective oxides are 96 mass % and 4 mass %) was prepared as a material 1, ZrO—$CeO_2$—$La_2O_3$—$Pr_6O_{11}$ (the contents of the respective oxides are 30 mass %, 60 mass %, 3 mass %, and 7 mass %) was prepared as a material 2, and $Fe_2O_3$—$ZrO_2$ (an atomic ratio of Fe:Zr=2:1) was prepared as a material 3. In addition, a palladium nitrate aqueous solution (produced by CATALER CORPORATION) containing a 8.8 mass % noble metal was prepared as a noble metal catalyst (material 4), and a 875 cc (600H/3-9R-08) cordierite honeycomb (produced by DENSO CORPORATION) was prepared as a substrate.

Comparative Example 14

A catalyst layer used was Pd(1.0)/$Al_2O_3$(70)+CZ(70)+a binder (each number within the parentheses indicates the unit of the coat amount: g/L). Pd/$Al_2O_3$ (a material 5) in which 1.42 mass % Pd is supported on $Al_2O_3$ of the material 1 was prepared by using the material 4. Herein, an impregnation method was used to cause Pd to be supported. Next, a slurry 1 obtained by causing the material 5, the material 2, and an $Al_2O_3$-based binder to be suspended in distilled water through agitation was prepared. Next, the slurry 1 was flowed onto the substrate, and unnecessary portions of the slurry 1 were blown away with a blower, whereby the wall surface of the substrate was coated with the material. Such a coating material was prepared so that the content of Pd became 1.0 g/L, the content of the material 1 became 70 g/L, and the content of the material 2 became 70 g/L with respect to the size of the substrate. Finally, moisture was removed with a dryer held at 120° C. for 2 hours, and then, baking was performed with an electric furnace at 500° C. for 2 hours to obtain the exhaust gas purification catalyst of Comparative Example 14.

Comparative Example 15

A catalyst layer used was Pd(1.0)/$Al_2O_3$(70)+FZ(35)+a binder (each number within the parentheses indicates the unit of the coat amount: g/L), and Comparative Example 14 was coated with 35 g/L of the material 3 instead of 70 g/L of the material 2. It should be noted that no other changes were made to the production process of Comparative Example 14.

Example 15

A catalyst layer used was Pd(1.0)/$Al_2O_3$(70)+CZ(70)+FZ(15)+a binder (each number within the parentheses indicates the unit of the coat amount: g/L), and Comparative Example 14 was coated with the 15 g/L of the material 3. It should be noted that no other changes were made to the production process of Comparative Example 14.

Example 16

A catalyst layer used was Pd(0.5)/$Al_2O_3$(70)+Pd(0.5)/$Al_2O_3$(70)+FZ(15)+a binder (each number within the parentheses indicates the unit of the coat amount: g/L). Pd/$Al_2O_3$ (a material 5) and Pd/CZ (a material 6) in which 0.71 mass % Pd is supported on $Al_2O_3$ of the material 1 and on the CZ of the material 2, respectively, were prepared by using the material 4. Herein, impregnation was conducted to cause Pd to be supported. Next, a slurry 2 obtained by causing the material 5, the material 6, the material 3, and the $Al_2O_3$-based binder to be suspended in distilled water through agitation was prepared. Next, the slurry 2 was flowed onto the substrate, and unnecessary portions of the slurry 2 were blown away with a blower, whereby the wall surface of the substrate was coated with the material. Such a coating material was prepared so that the content of Pd became 1.0 g/L, the content of the material 1 became 70 g/L, the content of the material 2 became 70 g/L, and the content of the material 3 became 15 g/L with respect to the size of the substrate. Finally, moisture was removed with a dryer held at 120° C. for 2 hours, and then, baking was performed with an electric furnace at 500° C. for 2 hours to obtain an exhaust gas purification catalyst of Comparative Example 16.

<Regarding OSC Evaluation Tests>

A/F feedback control was performed to attain 14.1 or 15.1 using an actual engine. Shortage or excess of oxygen was calculated from the following formula based on the difference between the stoichiometric point and the A/F sensor output, and the maximum oxygen storage amount was evaluated as the OSC.

$$OSC(g) = 0.23 \times \Delta A/F \times \text{fuel injection amount} \qquad \text{(Formula)}$$

<Regarding Endurance Tests>

An accelerated deterioration test was performed at 1000° C. (catalyst floor temperature) for 25 hours using an actual engine. The composition of the exhaust gas at that time was repeated among those in the rich region→stoichiometric region→lean region in a given cycle by adjusting the throttle opening degree and the engine load to accelerate deterioration.

<Regarding Test Results>

Figure 36:
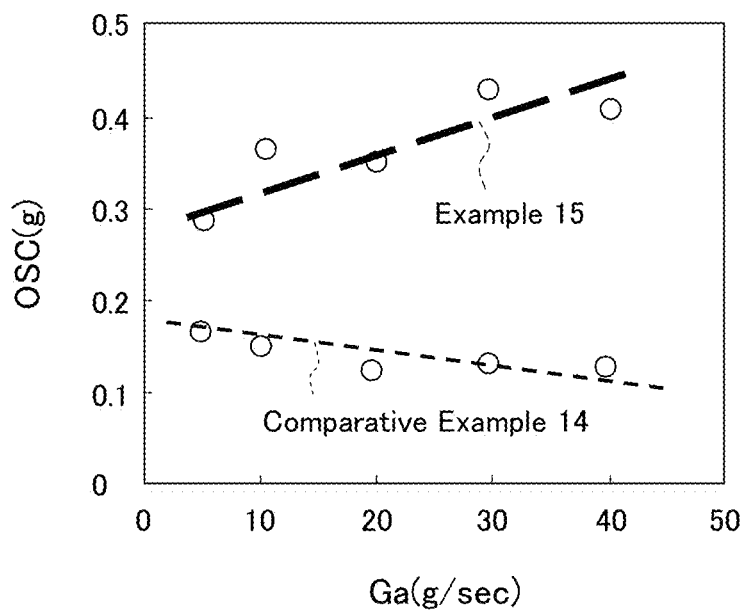
FIG. 36 is a chart showing the test results obtained by inspecting the OSC performance in the low-load region to the high-load region.
Figure 37:
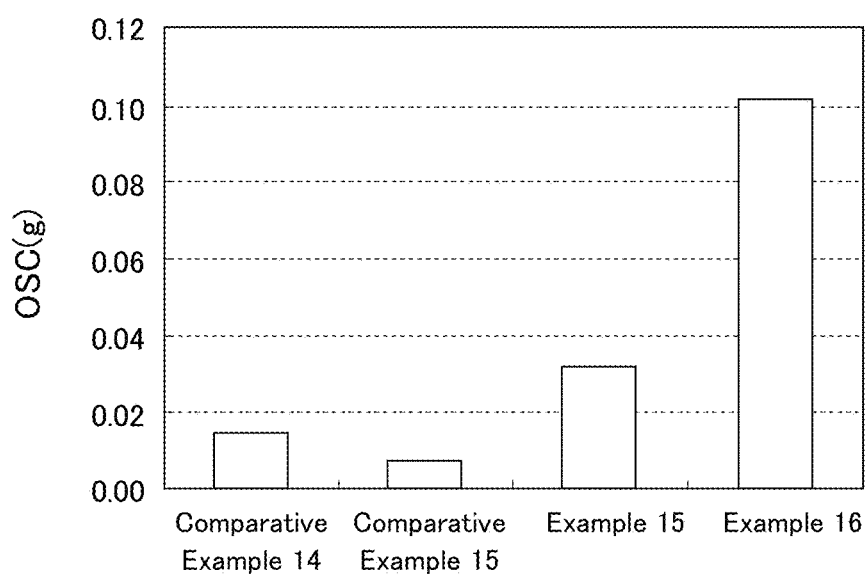
FIG. 37 is a chart showing the test results obtained by inspecting the OSC after the endurance.

FIG. 36 shows the results of the OSC evaluation tests, and FIG. 37 shows the results of the endurance tests.

FIG. 36 shows that the OSC performance of Comparative Example 14 tends to decrease in the high-load region (i.e., high temperature/high gas flow rate). Thus, in response to such decrease, the amount of the noble metal catalyst supported should be increased.

In contrast, it has been demonstrated the OSC performance of Example 15 is improved in the high-load region. This is due to the reason that the catalyst layer contains a FZ material in addition to a CZ material. When a case is supposed where a catalyst layer is made to contain both $Fe_2O_3$ and a CZ material with OSC performance as a contrasting example of Example 15, it is concerned that Fe and Ce may react with each other and thus the properties of both the elements may decrease, which is unfavorable. In Example 15 in which a heat-resistant FZ material is used, such a problem is solved.

In addition, FIG. 37 shows that the OSC performance after the endurance of each of Examples 15 and 16 is significantly higher than that of Comparative Examples 14 and 15. Specifically, the OSC performance after the endurance of Example 15 is about twice that of Comparative Example 14, and the OSC performance after the endurance of Example 16 is about sixth times that of Comparative Example 14. In addition, the OSC performance after the endurance of Example 15 is about sixth times that of Comparative Example 15, and the OSC performance after the endurance of Example 16 is about 17th times that of Comparative Example 15.

Since the FZ material has high OSC performance in the high-temperature region and Fe serves as an active site, it possible to ensure high OSC performance in the high-temperature region after the endurance without increasing the amount of the noble metal catalyst supported.

In FIG. 37, the OSC performance after the endurance of Example 16 is about three times that of Example 15. This shows that defining a promoter on which a noble metal catalyst is supported is important for the OSC performance to be exhibited after the endurance.

Embodiment 3

Next, Embodiment 3 of the exhaust gas purification catalyst of the present invention will be described.

Figure 38:
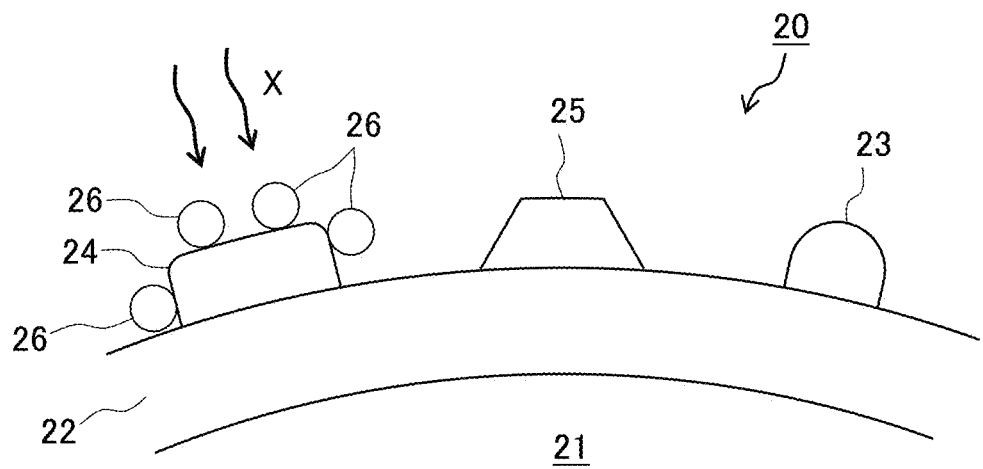
FIG. 38 are partially enlarged schematic diagrams of Embodiment 3 of the exhaust gas purification catalyst of the present invention; specifically.
Figure 38:
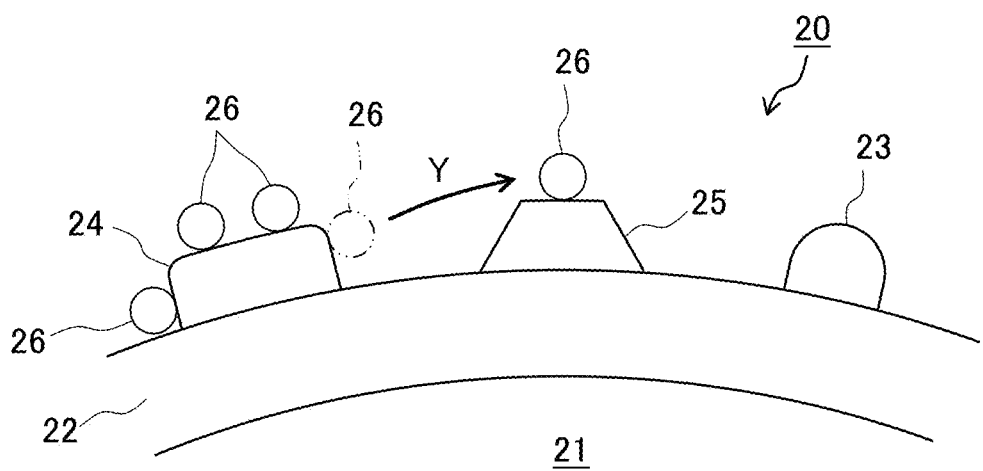
Figure 39:
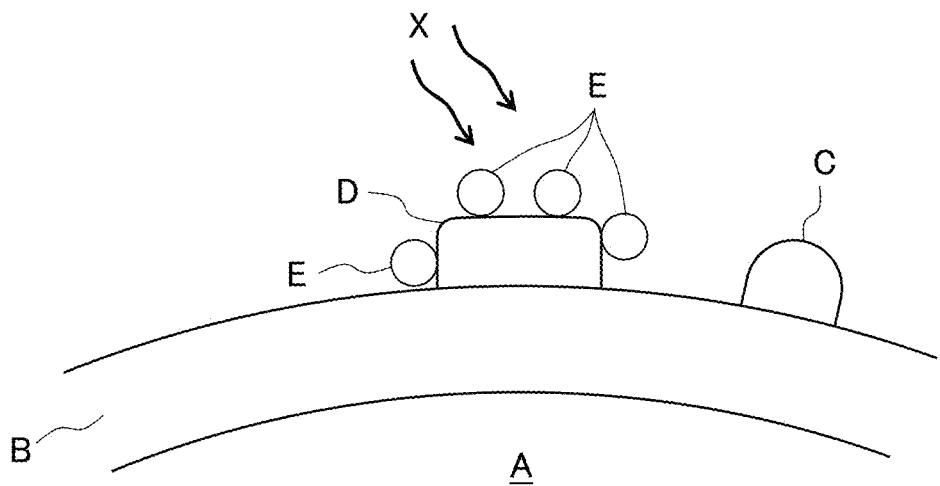
FIG. 39 are partially enlarged schematic diagrams of an embodiment of the conventional exhaust gas purification catalyst; specifically.
Figure 39:
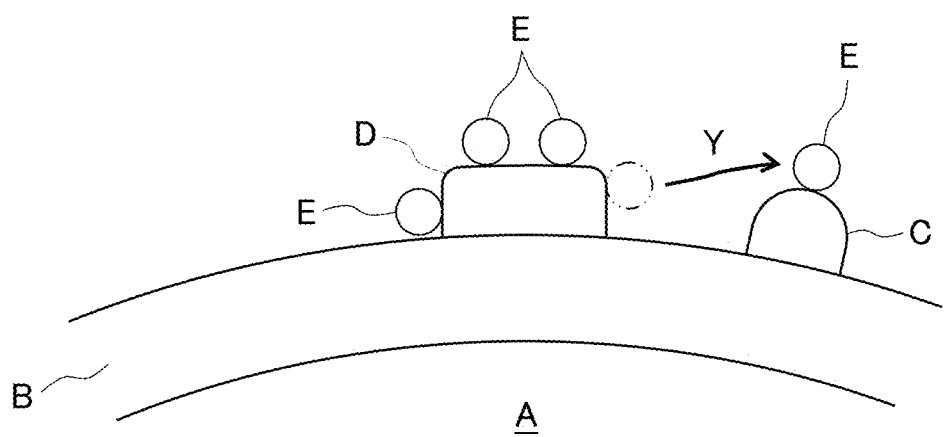

FIG. 38 are partially enlarged schematic diagrams of Embodiment 3 of the exhaust gas purification catalyst of the present invention; specifically, FIG. 38a is a diagram showing the state in the lean air-fuel ratio region, and FIG. 38b is a diagram showing the state in the rich air-fuel ratio region. Meanwhile, FIG. 39, which are shown as contrasting examples of FIG. 38, are partially enlarged schematic diagrams of an embodiment of the conventional exhaust gas purification catalyst; specifically, FIG. 39a is a diagram showing the state in the lean air-fuel ratio region, and FIG. 39b is a diagram showing the state in the rich air-fuel ratio region.

An exhaust gas purification catalyst 20 shown in FIG. 38 includes, for example, a support 21 made of ceramic cells with a honeycomb structure, a catalyst layer 22, which is made of an oxide support, formed on the surface of the support 21, Pd or Pt that is a noble metal catalyst 23 supported on the catalyst layer 22, a barium compound 24 (e.g., BaO), which is a component forming the catalyst layer 22 and is a catalyst material other than the oxide support that is the main component, and an iron oxide-zirconia composite oxide 25. That is, the catalyst layer 22 includes as a main component an oxide support on which the noble metal catalyst 23 is supported, and also includes the barium compound 24 and the iron oxide-zirconia composite oxide 25.

Herein, the oxide support, which is a main component of the catalyst layer 22, is an oxide support formed from one of $CeO_2$, $ZrO_2$, or $Al_2O_3$; a composite oxide support formed from two of $CeO_2$, $ZrO_2$, or $Al_2O_3$ and another oxide; or a composite oxide support formed from two or more of such oxides. Examples of the oxide support include a $CeO_2$—$ZrO_2$ composite oxide support, a $CeO_2$—$Al_2O_3$ composite oxide support, a $CeO_2$—$TiO_2$ composite oxide support, a $CeO_2$—$SiO_2$ composite oxide support, and a $CeO_2$—$ZrO_2$—$Al_2O_3$ composite oxide support.

Meanwhile, examples of the iron oxide-zirconia composite oxide 25 include a $Fe_2O_3$—$ZrO_2$ composite oxide and a $Fe_2O_3$—$ZrO_2$—$Y_2O_3$ composite oxide.

In the lean air-fuel ratio region (e.g., an oxygen atmosphere of 200° C. or greater) shown in FIG. 38a, sulfur 26 in the fuel is trapped by the barium compound 24 (in the X-direction) through vitriolization, whereby sulfur adsorption (sulfur poisoning) onto the noble metal catalyst 23 containing Pd or the like is suppressed.

In addition, as the iron-oxide zirconia composite oxide 25 with high heat resistance is contained in addition to the barium compound 24, a decrease in the initial activity of the catalyst can be suppressed.

Meanwhile, in the rich air-fuel ratio region (e.g., a reducing atmosphere of about 500° C. or greater) shown in FIG. 38b, the sulfur 26, which has been trapped by the barium compound 24, is trapped by the iron-oxide zirconia composite oxide 25 (in the Y-direction) instead of being adsorbed onto the noble metal catalyst 23. Thus, sulfur adsorption onto the noble metal catalyst 23 can be suppressed.

In contrast, one embodiment of the conventional exhaust gas purification catalyst includes, as shown in FIG. 39a, a support A, a catalyst layer B made of an oxide support formed on the surface of the support A, Pd, which is a noble metal catalyst C supported on the catalyst layer B, and a barium oxide D that is a component forming the catalyst layer B and is a catalyst material other than the oxide support that is the main component. In the lean air-fuel ratio region, sulfur E in the fuel can be trapped by the barium oxide D (in the X-direction) as in the exhaust gas purification catalyst 20.

However, since an iron oxide-zirconia composite oxide is no present, in the rich air-fuel ratio region, sulfur E, which has been trapped by the barium oxide D, is adsorbed onto the noble metal catalyst C (in the Y-direction) as shown in FIG. 39b. Thus, the noble metal catalyst is poisoned with sulfur, which can lower the performance of the catalyst performance.

As described above, since the exhaust gas purification catalyst 20 shown in FIG. 38 contains a mixture of an oxide support on which Pd, which is a noble metal catalyst, or the like is supported, a barium compound, and an iron oxide-zirconia composite oxide, it is possible to suppress adsorption of sulfur onto Pd or the like under the reducing atmosphere in the temperature range in which the catalyst is actually used while suppressing a decrease in the initial activity of the catalyst. Thus, an exhaust gas purification catalyst with excellent NOx purification performance can be obtained.

A preferable embodiment of an iron oxide-zirconia composite oxide for forming the exhaust gas purification catalyst 20 of the present invention is a composite oxide containing iron, zirconium, and a rare-earth element as described above. The total content of $Fe_2O_3$, $ZrO_2$, and an oxide of the rare-earth element is not less than 90 mass %, the content of an iron oxide in terms of $Fe_2O_3$ is 10 to 90 mass %, and the absolute value of the covariance COV(Fe, Zr+Y) of the composite oxide, which has been baked in the atmosphere at 900° C. for 5 hours, determined by the three formulae of [Math. 3] above, is not greater than 20.

[Experiments of Verifying the Nox Purification Rate of when Sulfur is Adsorbed (in the Temperature Range in which the Catalyst is Actually Used) and in the (Initial) State in which Sulfur is not Adsorbed, and Results Thereof]

The inventors produced an exhaust gas purification catalyst with the structure shown in FIG. 38 (Example 17) and exhaust gas purification catalysts as various comparative examples, and measured the NOx purification rate of when sulfur was adsorbed (in the temperature range in which the catalyst was actually used) and in the (initial) state in which sulfur was not adsorbed.

As the composition of the raw material powder, $Al_2O_3$—$La_2O_3$ (the contents of the respective oxides are 96 mass % and 4 mass %) was prepared as a composite oxide (A), $ZrO_2$—$CeO_2$—$La_2O_3$—$Y_2O_3$ (the contents of the respective oxides are 60 mass %, 30 mass %, 5 mass %, and 5 mass %) was prepared as a composite oxide (B), a material obtained by causing Pd to be supported on the composite oxide (B) was prepared as a material X, a material obtained by causing Pd to be supported on the composite oxide (A) was prepared as a material Y, and an iron oxide-zirconia composite oxide was prepared as a material Z.

Herein, the material X was produced by causing 0.5 mass % Pd to be supported on the composite oxide (B) by applying an evaporation drying method (using a Pd nitrate aqueous solution and performing baking at 500° C. for 2 hours).

Meanwhile, the material Y was produced by causing 0.5 mass % Pd to be supported on the composite oxide (A) by applying an evaporation drying method (using a Pd nitrate aqueous solution and performing baking at 500° C. for 2 hours).

Further, the material Z was produced by preparing desired amounts of a zirconia sol water suspension containing a rare-earth element and organic acid iron to obtain a mixed solution thereof, thermally condensing the mixed solution, and baking the resulting gel. Using such material, a catalyst layer (e.g., an exhaust gas purification catalyst) of each of examples and Comparative Examples 16 to 19 was produced as described below. Although a barium oxide (BaO) is used in the present experiments, it is also possible to use a catalyst obtained by adding $BaSO_4$ or $BaCO_3$, which is a barium compound other than the barium oxide, or a mixed material of two or more of BaO, $BaSO_4$, or $BaCO_3$.

Example 17

A 50.81 g material X, a 31.92 g material Y, a 3.82 g material Z, 6.36 g BaO, and 102.88 g distilled water were prepared and poured into a polyethylene beaker with a size of 500 ml, and were then agitated with a mixer for 30 minutes. Next, the mixture was mixed with a ball mill for 20 minutes to prepare a slurry. Then, the slurry was uniformly poured into a 35 cc ceramic honeycomb (produced by NGK INSULATORS, LTD., φ 30 mm×L 50 mm, 400 cells/4 mills), dried (120° C. for one night), and then baked at 500° C. for 2 hours. At this time, the coat amount for the formation of the catalyst layer (catalyst coating) was set to 5.336 g/piece.

Comparative Example 16

An exhaust gas purification catalyst was prepared through the same steps as those in Example 17, but BaO and the material Z in the catalyst layer were not contained.

Comparative Example 17

An exhaust gas purification catalyst was prepared through the same steps as those in Example 17, but the material Z in the catalyst layer was not contained.

Comparative Example 18

An exhaust gas purification catalyst was prepared through the same steps as those in Example 17, but BaO in the catalyst layer was not contained, and the material Z was replaced with $Fe_2O_3$.

Comparative Example 19

An exhaust gas purification catalyst was prepared through the same steps as those in Example 17, but BaO was not contained.

<Evaluation of Activity>

The NOx purification rate was evaluated at a temperature of 450° C. at a flow rate of 25 liters/minute under the gas conditions (in the rich region) of 0.41% $O_2$–9.5% $CO_2$–0.9% CO+0.35 $H_2$+0.45% $C_3H_6$+0.19% NO+4.73% $H_2O$.

<Regarding the NOx Purification Rate of when Sulfur is Adsorbed or not>

A sulfur adsorption process was performed at a temperature of 500° C. at a flow rate of 25 liters/minute under the gas conditions (in the rich region) of 0.41% $O_2$–9.5% $CO_2$–0.9% CO+0.3% $H_2$+0.45% $C_3H_6$+0.19% NO+4.73% $H_2O$ (1-minute/2-minute cycle) and the gas conditions (in the lean region) of 0.92% $O_2$–9.5% $CO_2$–0.15% CO+0.05% $H_2$+0.18% $C_3H_6$+0.19% NO+4.73% $H_2O$ (1-minute/2-minute cycle).

Figure 40:
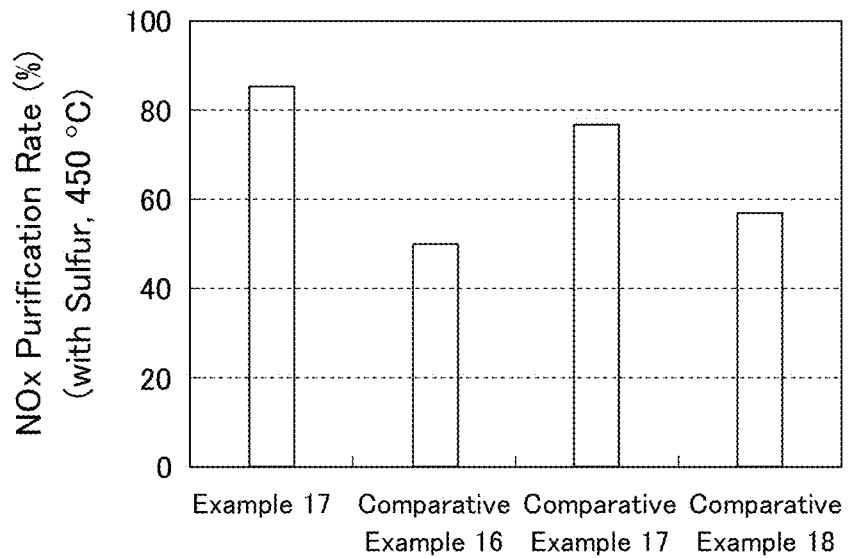
FIG. 40 is a chart showing the experimental results obtained by inspecting the NOx purification rate of when sulfur was adsorbed (in the temperature range in which the catalyst was actually used).
Figure 41:
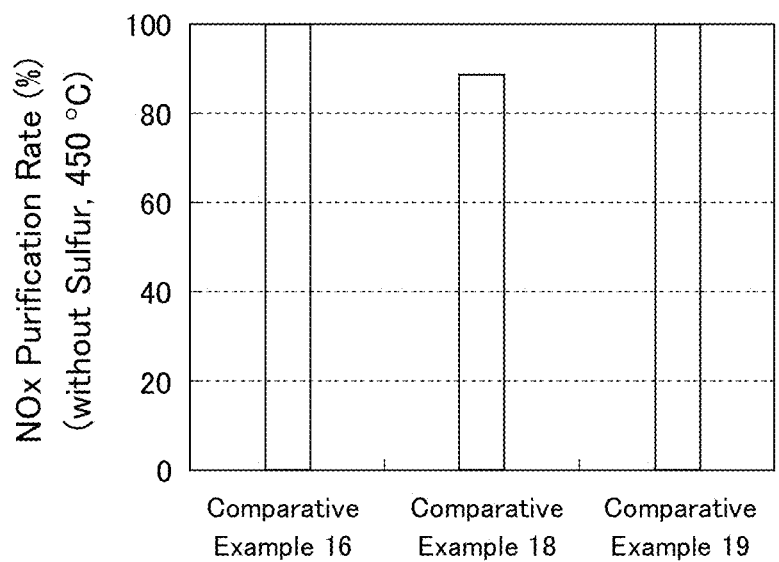
FIG. 41 is a chart showing the experimental results obtained by inspecting the initial activity (NOx purification rate) in the (initial) state in which sulfur was not adsorbed.

The aforementioned activity evaluation was performed after exposing each catalyst to a reaction gas containing a 50 ppm $SO_2$ or a reaction gas not containing 50 ppm $SO_2$ for 14 minutes under the aforementioned gas conditions. FIGS. 40 and 41 show the experiment results thereof. It should be noted that FIG. 40 shows the experimental results obtained by inspecting the NOx purification rate of when sulfur was adsorbed (in the temperature range in which the catalyst was actually used), while FIG. 41 shows the experimental results obtained by inspecting the initial activity (the NOx purification rate) in the (initial) state in which sulfur was not adsorbed.

FIG. 40 demonstrates that the catalyst layer not containing Ba or Fe (Comparative Example 16) has a low NOx purification rate since Pd is poisoned with sulfur.

FIG. 40 also shows that in the catalyst layer containing Ba (Comparative Example 17), sulfur poisoning of Pd is suppressed due to the sulfur trapping performance. Thus, the Nox purification rate is improved more than in Comparative Example 16. However, it has been demonstrated that since the sulfur trapping performance of Ba starts to decrease as sulfate is decomposed, the NOx purification rate of Comparative Example 17 is lower than that of Example 17.

Further, FIG. 40 shows that in the catalyst layer containing Fe (Comparative Example 18), sulfur poisoning of Pd is suppressed by the sulfur desorption performance, and thus, such a catalyst layer has a slightly higher NOx purification rate than that of Comparative Example 16.

Meanwhile, FIG. 41 demonstrates that although the catalyst layer containing Fe (Comparative Example 18) has lowered initial activity, the catalyst layer containing an iron oxide-zirconia composite oxide (Comparative Example 19) does not have lowered initial activity.

The foregoing experimental results demonstrate that when a catalyst layer that forms an exhaust gas purification catalyst contains both a barium compound and an iron oxide-zirconia composite oxide, the exhaust gas purification catalyst can be excellent in both the catalyst activity in the temperature range in which the catalyst is actually used (when sulfur is present) and the initial catalyst activity (when sulfur is not present).

INDUSTRIAL APPLICABILITY

As described above, according to the present invention, an iron oxide-zirconia composite oxide that exhibits a high oxygen storage capacity can be obtained.

Thus, since the iron oxide-zirconia composite oxide of the present invention exhibits a high oxygen storage capacity even after it is exposed to the atmosphere under a high-temperature environment, it can be advantageously used as a support of an exhaust gas purification catalyst that is used in a relatively high temperature of 300° C. or greater, for example, an oxygen storage material for an exhaust gas purification catalyst.

REFERENCE SIGNS LIST 1, 21 Support
2, 22 Catalyst layer
3 Aluminum oxide ($Al_2O_3$)
4 Cerium oxide-zirconia composite oxide
5, 25 Iron oxide-zirconia composite oxide
6 Noble metal catalyst (Pd, Pt)
10, 10A, 20 Exhaust gas purification catalyst
23 Noble metal catalyst
24 Barium compound
26 Sulfur

The invention claimed is:

1. An iron oxide-zirconia composite oxide comprising iron, zirconium, and a rare-earth element, wherein
a total content of $Fe_2O_3$, $ZrO_2$, and an oxide of the rare-earth element (X) is not less than 90 mass %,
a content of an iron oxide in terms of $Fe_2O_3$ is 10 to 90 mass %, and
an absolute value of covariance COV(Fe, Zr+X) of the composite oxide, which has been baked in the atmosphere at a temperature of greater than or equal to 900° C. for 5 hours or more, determined by the following Formulae (1) to (3), is not greater than 30:

[Math. 1]

$$R_i(Fe) = \frac{I_i(Fe) \times 100}{I_i(Fe) + I_i(Zr) + I_i(X)} \quad (1)$$

$$R_i(Zr+X) = \frac{\{I_i(Zr) + I_i(X)\} \times 100}{I_i(Fe) + I_i(Zr) + I_i(X)} \quad (2)$$

$$COV(Fe, Zr+X) = \quad (3)$$

$$\frac{1}{n}\sum_{i=1}^{n} [\{R_i(Fe) - R_{av}(Fe)\} \times \{R_i(Zr+X) - R_{av}(Zr+X)\}]$$

(in the formula, $I_i(Fe)$, $I_i(Zr)$, and $I_i(X)$ respectively represent ratios of X-ray intensities of iron, zirconium, and the rare-earth element measured at a measurement point i (where i=1 to n) to 100% intensities of the respective elements as measured by subjecting the composite oxide to a ray analysis through EPMA (WDX: wavelength dispersive X-ray spectrometry) under conditions of an accelerating voltage of 15 kV, a sample current of 50 nA, a minimum beam diameter (not greater than 1 μm), and measurement intervals of 1 μm, where $R_{av}(Fe)$ and $R_{av}(Zr+X)$ represent mean values of $R_i(Fe)$ and $R_i(Zr+X)$, respectively, at all measurement points n).

2. The iron oxide-zirconia composite oxide according to claim 1, wherein the absolute value of the covariance COV(Fe, Zr+X) of the composite oxide, which has been baked in the atmosphere at a temperature of greater than or equal to 900° C. for 5 hours or more, determined by the Formulae (1) to (3), is not greater than 20.

3. The iron oxide-zirconia composite oxide according to claim 1, wherein the iron oxide in the composite oxide, which has been baked in the atmosphere at a temperature of greater than or equal to 900° C. for 5 hours or more, contains hematite.

4. The iron oxide-zirconia composite oxide according to claim 1, wherein the composite oxide contains lanthanum.

5. The iron oxide-zirconia composite oxide according to claim 4, wherein the composite oxide, which has been baked in the atmosphere at a temperature of greater than or equal to 900° C. for 5 hours or more, contains at least one of a lanthanum-iron composite oxide or a lanthanum-zirconium composite oxide.

6. The iron oxide-zirconia composite oxide according to claim 4, wherein the absolute value of the covariance COV(Fe, Zr+X) of the composite oxide, which has been baked in the atmosphere at 1100° C. for 10 hours, determined by the Formulae (1) to (3), is not greater than 20.

7. The iron oxide-zirconia composite oxide according to claim 4, wherein an atomic ratio of lanthanum to iron (La/Fe) is not less than 1.1 and not greater than 2.1.

8. The iron oxide-zirconia composite oxide according to claim 4 wherein an atomic ratio of lanthanum to iron (La/Fe) is not less than 1.1 and not greater than 2.0.

9. The iron oxide-zirconia composite oxide according to claim 1, further comprising yttrium.

10. An exhaust gas purification catalyst comprising a support and a catalyst layer formed on the support, wherein
the catalyst layer includes a cerium oxide-zirconia composite oxide, $Al_2O_3$, and the iron oxide-zirconia composite oxide according to claim 1, and
one of the oxides has supported thereon a noble metal catalyst of at least one of Pt or Pd.

11. The exhaust gas purification catalyst according to claim 10, wherein the noble metal catalyst is supported on the cerium oxide-zirconia composite oxide or $Al_2O_3$.

12. The exhaust gas purification catalyst according to claim 10, wherein the noble metal catalyst is supported on both the cerium oxide-zirconia composite oxide and $Al_2O_3$.

13. An exhaust gas purification catalyst comprising a support and a catalyst layer formed on the support, wherein
the catalyst layer includes an oxide support containing at least one of $CeO_2$, $ZrO_2$, or $Al_2O_3$ as a main component, the oxide support having supported thereon Pd or Pt that is a noble metal catalyst, a barium compound, and the iron oxide-zirconia composite oxide according to claim 1.

14. A method for producing an iron oxide-zirconia composite oxide, comprising:
mixing a zirconia sol water suspension containing a rare-earth element with organic acid iron to form a mixed solution to attain a proportion in which a total content of $Fe_2O_3$, $ZrO_2$, and an oxide of the rare-earth element is not less than 90 mass %, and a content of an iron oxide in terms of $Fe_2O_3$ is 10 to 90 mass %;

thermally condensing the obtained mixed solution to form a gel; and
baking the gel.

15. The method for producing an iron oxide-zirconia composite oxide according to claim 14, further comprising mixing a lanthanum oxide into the mixed solution of the zirconia sol water suspension containing the rare-earth element and the organic acid iron.

* * * * *